Aug. 16, 1960
C. G. ROPER ET AL
2,949,273
AUTOMATIC PROCESS CONTROL SYSTEM
Filed Nov. 2, 1953
11 Sheets-Sheet 4
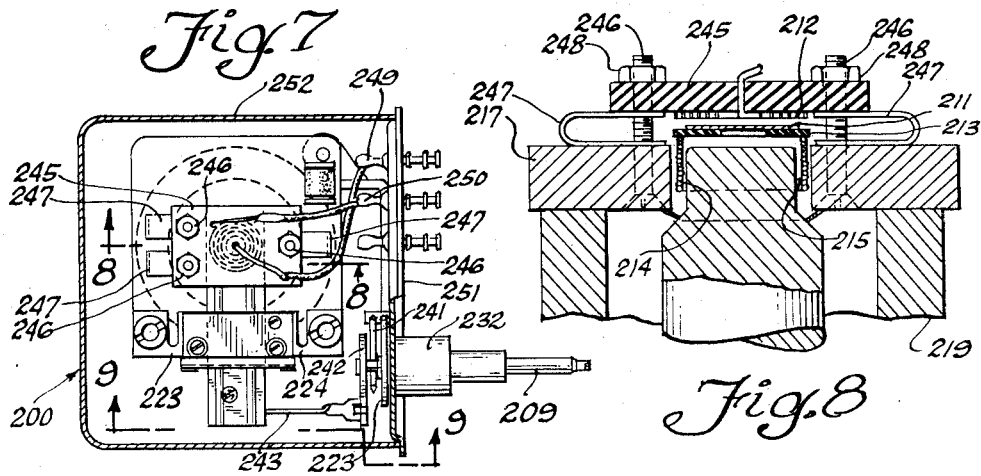
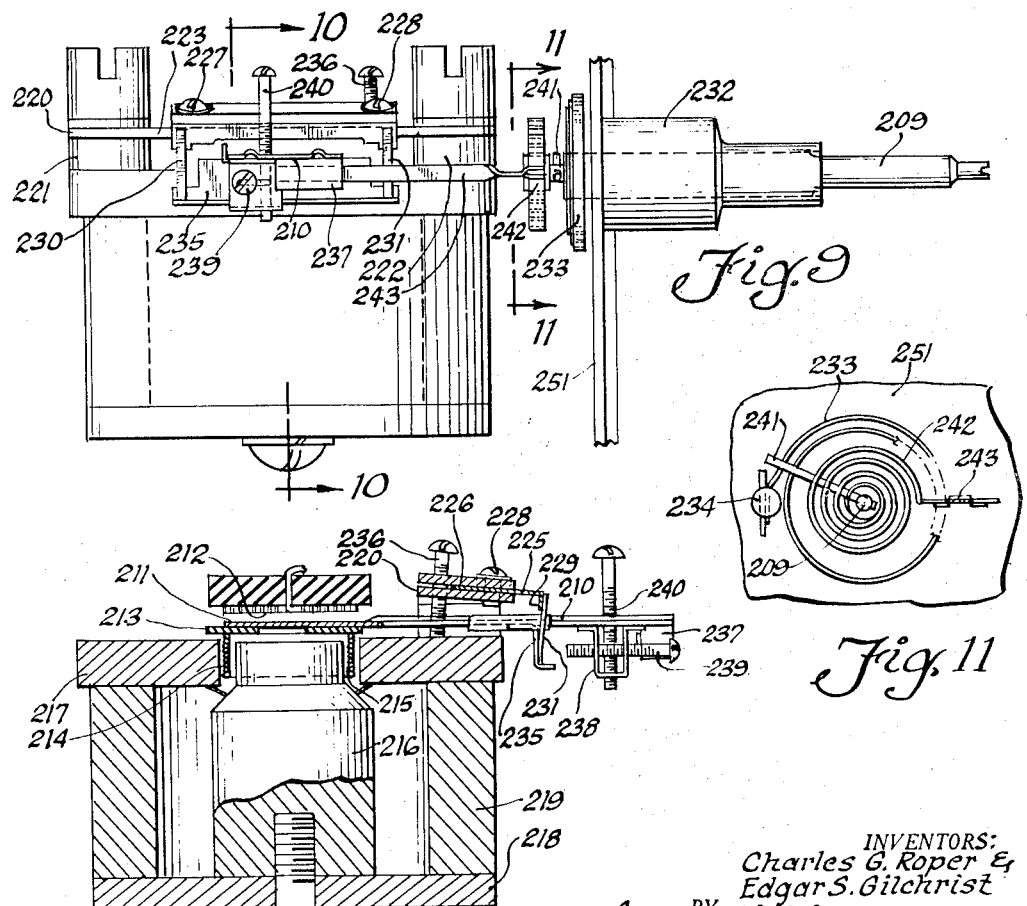
INVENTORS:
Charles G. Roper &
Edgar S. Gilchrist
BY Mason, Kolehmainen,
Rathburn & Wyss
Attorneys

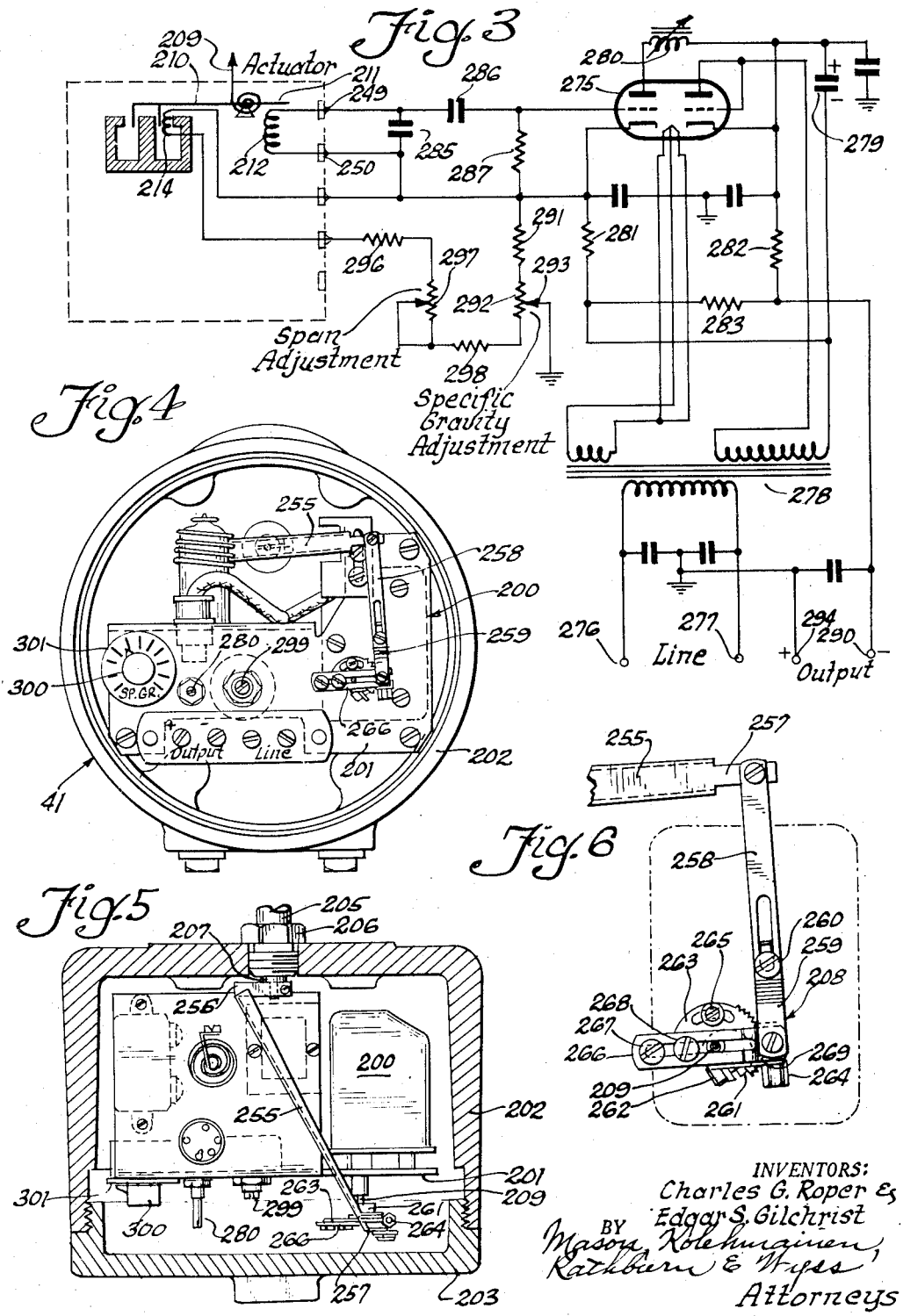

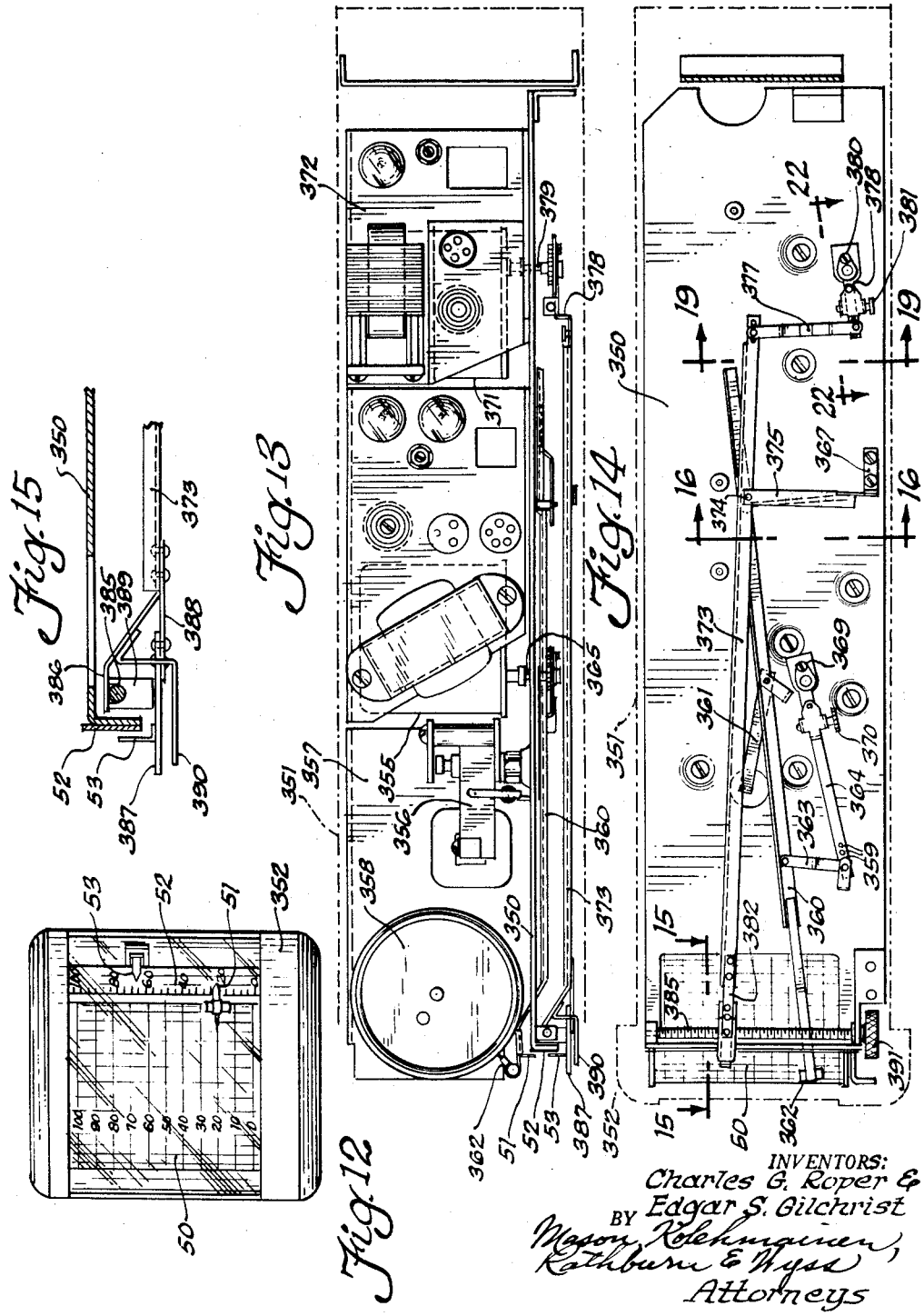

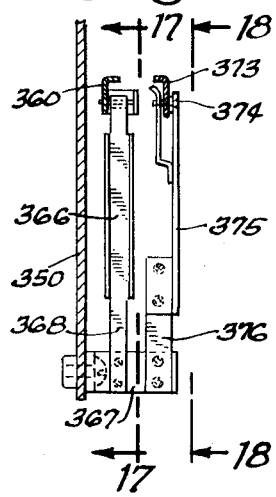
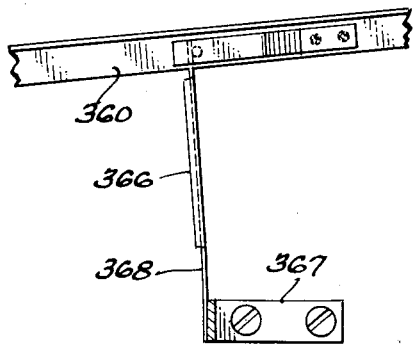
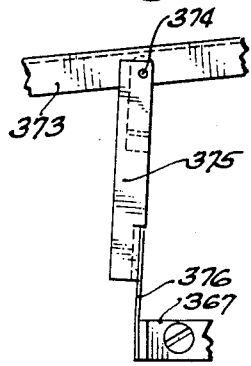
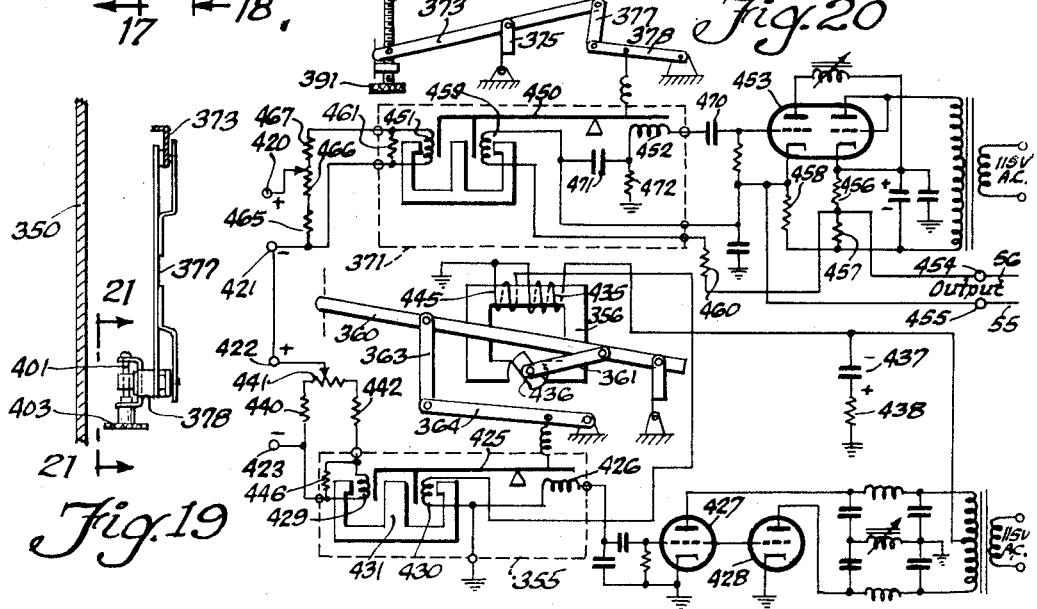
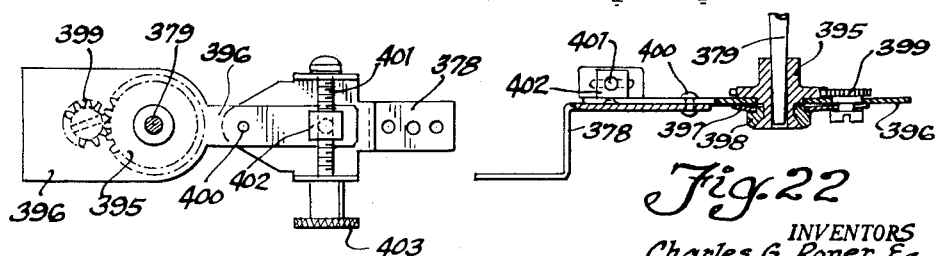

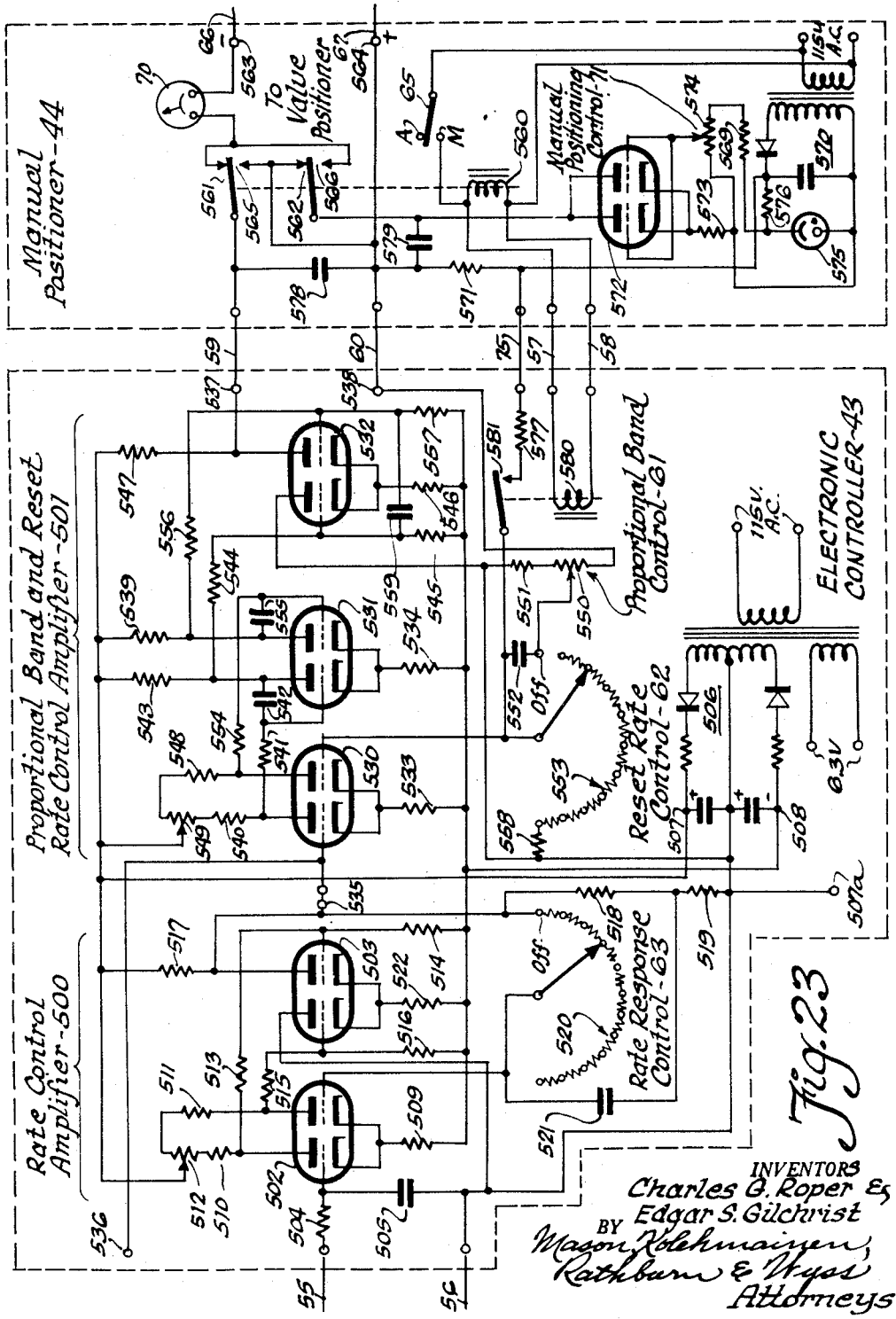

INVENTORS:
Charles G. Roper
Edgar S. Gilchrist

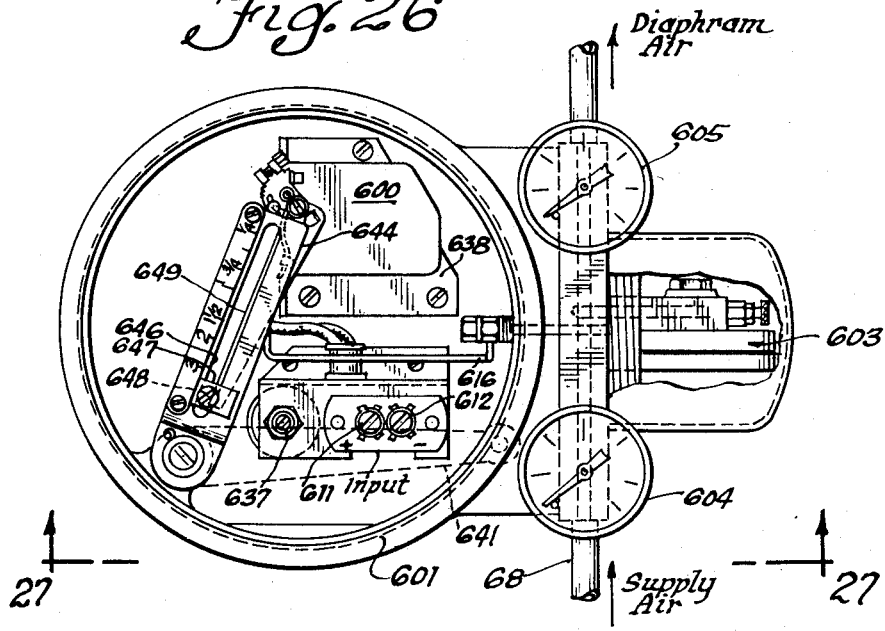

INVENTORS
Charles G. Roper &
Edgar S. Gilchrist
BY Mason, Kolehmainen,
Rathburn & Wyss
Attorneys

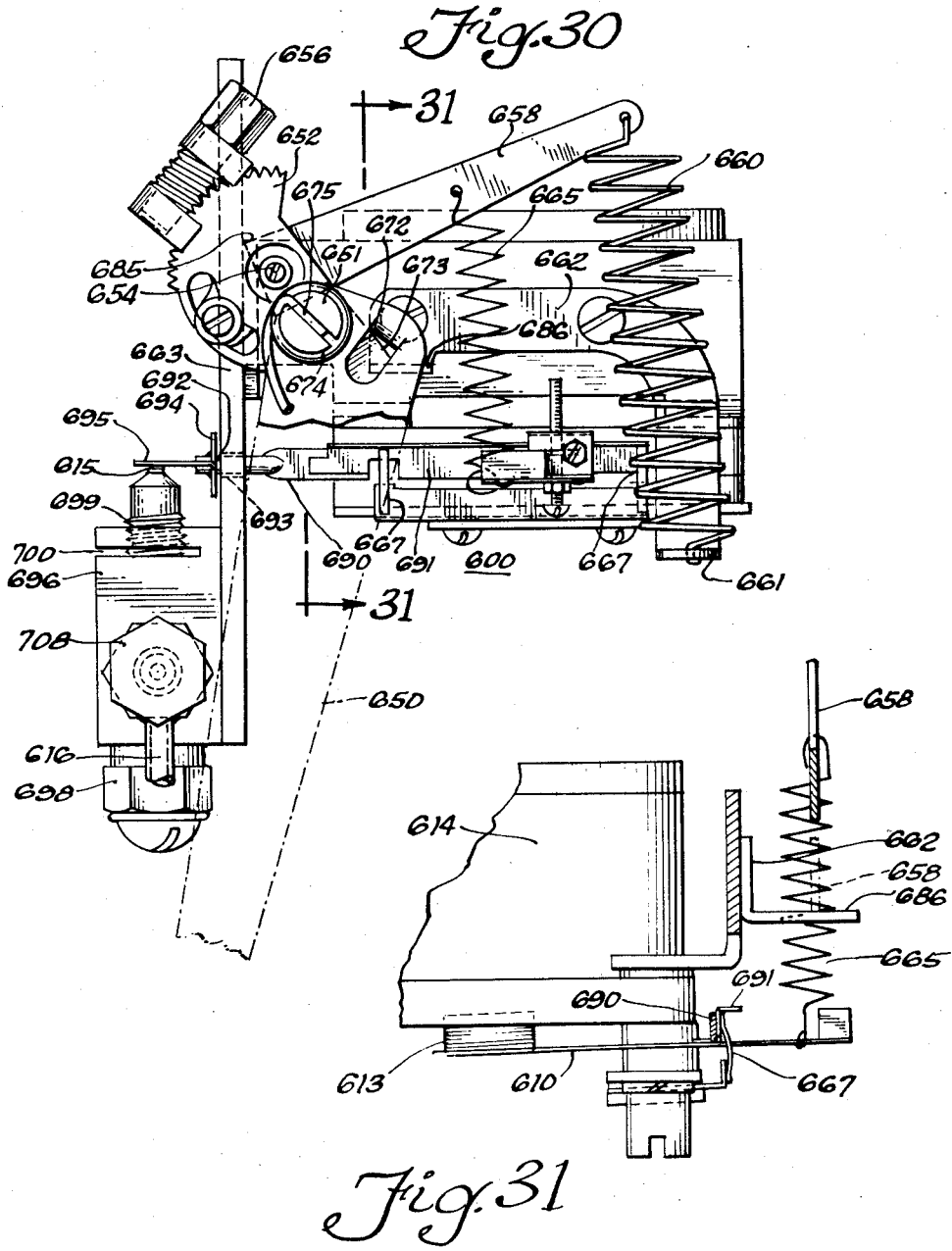

United States Patent Office 2,949,273
Patented Aug. 16, 1960

2,949,273

AUTOMATIC PROCESS CONTROL SYSTEM

Charles G. Roper, Fairfield, and Edgar S. Gilchrist, Easton, Conn., assignors, by mesne assignments, to Robertshaw-Fulton Controls Company, Richmond, Va., a corporation of Delaware Filed Nov. 2, 1953, Ser. No. 389,564

20 Claims. (Cl. 251—26)

The present invention relates to an automatic control system, more particularly, to a system for automatically controlling one or more variable quantities of an industrial process, and the invention has for an object the provision of a system of this type wherein transmission lag is substantially eliminated and a high degree of stability is achieved so as to permit the use of narrow proportional bands and to provide a system which is very sensitive to changes in the measured variables.

It is another object of the present invention to provide a new and improved automatic process control system wherein provision is made for changing from automatic to manual control and vice versa without producing an undesired discontinuity or "bump" in the process so as to permit service and repair of the automatic control units and manual adjustment of the process without interfering with the continuity thereof.

It is a further object of the present invention to provide a new and improved automatic process control system having proportional-reset action wherein the valve travel on changing from manual to automatic operation is independent of the setting of the proportional band control of the system and the changeover from manual to automatic control does not require increasingly critical adjustments as narrower proportional bands are used.

It is a still further object of the present invention to provide a new and improved automatic process control system of the electronic type which may be completely energized from unregulated alternating current sources while providing a high degree of stability and sensitivity.

It is another object of the present invention to provide a new and improved automatic process control system whereby a given control arrangement may be expanded by providing an overall feedback loop without producing additive time lags through the system so that the accuracy of control of the overall system is increased.

It is still another object of the present invention to provide a new and improved automatic process control system of the electrical type wherein a major control loop is employed and a series of minor control loops are individually associated with different series components of the major control loop to improve the quality of these series components, said major and minor loops each including degenerative feedback arrangements whereby the stability of gain and dynamic response of the system is improved.

Another object of the present invention resides in the provision of a new and improved automatic process control system wherein control components are standard and are interchangeable at the control panel regardless of the type of variable under control.

Still another object of the invention resides in the provision of an automatic process control system of the electronic type wherein electro-pneumatic transducers are provided to tie into pneumatic control systems when required.

It is another object of the present invention to provide a new and improved automatic process control system of the electrical type in which a series of control loops responsive to different variables may be cascaded and an indication of the set point of each variable is provided.

It is still another object of the present invention to provide a new and improved automatic process control system of the electrical type which is particularly adapted to function with conventional analog to digital computers and conventional calculating machines to provide monitoring and computation facilities for the process without substantial modification of the control system.

It is still further an object of the present invention to provide a new and improved automatic process control system in which direct current signals are transmitted in both directions between the process and control areas which are substantially free from fluctuations or noise resulting from a carrier signal or signal chopping device which are in the frequency range of useful control signals of the system.

It is another object of the present invention to provide a new and improved automatic process control system of the electrical type wherein the same type of signal is provided for both input and output so that several control units may be connected in series for cascade control.

It is a further object of the present invention to provide a new and improved automatic process control system of the electrical type wherein the input and output conductors of the system may be connected to different potentials while permitting the transmission of a direct current signal through the system.

It is a still further object of the present invention to provide a new and improved automatic process control system wherein the output current of the measuring and control components is stabilized against the effects of load circuit resistance changes and the presence of voltage sources in the load circuit.

The invention, both as to its organization and method of operation, together with further objects and advantages thereof, will best be understood by reference to the following specification taken in connection with the accompanying drawings, in which:

Fig. 3 is an electrical circuit diagram of the transmitter unit in the system shown in Fig. 1;

Fig. 4 is a side elevational view of a transmitter unit positioned in an explosion proof housing and showing the mechanical features thereof;

Fig. 5 is a plan view, partly in section of the transmitter unit of Fig. 4;

Fig. 6 is a fragmentary side elevational view of a portion of the transmitter unit of Fig. 4, on a somewhat larger scale;

Fig. 7 is a plan view, partly in section, of the electromechanical balance used in the transmitter unit of Fig. 4;

Fig. 8 is a fragmentary side elevational view, in section, taken along the line 8—8 of Fig. 7;

Fig. 9 is a fragmentary sectional view taken along the line 9—9 of Fig. 7;

Fig. 10 is a sectional side elevational view taken along the line 10—10 of Fig. 9;

Fig. 11 is a fragmentary side elevational view taken along the line 11—11 of Fig. 9;

Fig. 12 is a front view of the recording and set point unit of the system of Fig. 1;

Fig. 13 is a plan view of the chassis of the recording and set point unit of Fig. 12;

Fig. 14 is a side elevational view of the chassis of Fig. 13;

Fig. 15 is a fragmentary plan view, in section, of the chassis of Fig. 14 taken along the line 15—15 thereof;

Fig. 16 is a sectional side elevational view taken along the line 16—16 of Fig. 14;

Fig. 17 is a fragmentary side elevational view, taken along the line 17—17 of Fig. 16;

Fig. 18 is a fragmentary side elevational view, taken along the line 18—18 of Fig. 16;

Fig. 19 is a sectional side elevational view taken along the line 19—19 of Fig. 14;

Fig. 20 is a schematic diagram of the electrical circuits of the recorder and set point unit of the system of Fig. 1;

Fig. 21 is a side elevational view taken along the line 21—21 of Fig. 19;

Fig. 22 is a sectional plan view taken along the line 22—22 of Fig. 14;

Fig. 23 is an electrical circuit diagram of the electronic controller and manual positioning units in the system shown in Fig. 1;

Fig. 26 is a side elevational view of the valve positioning unit of Fig. 24 with the cover thereof removed and a portion thereof broken away to show the details of the air relay incorporated therein;

Fig. 27 is a bottom view of the valve positioning unit of Fig. 24 with a portion of the casing thereof broken away;

Fig. 30 is a fragmentary side elevational view on a somewhat larger scale, of the electromechanical balance unit and associated components used in the valve positioning unit of Fig. 26 with the cover of the balance unit removed; and Fig. 31 is a fragmentary sectional view taken along the line 31—31 of Fig. 30.

Figure 1:
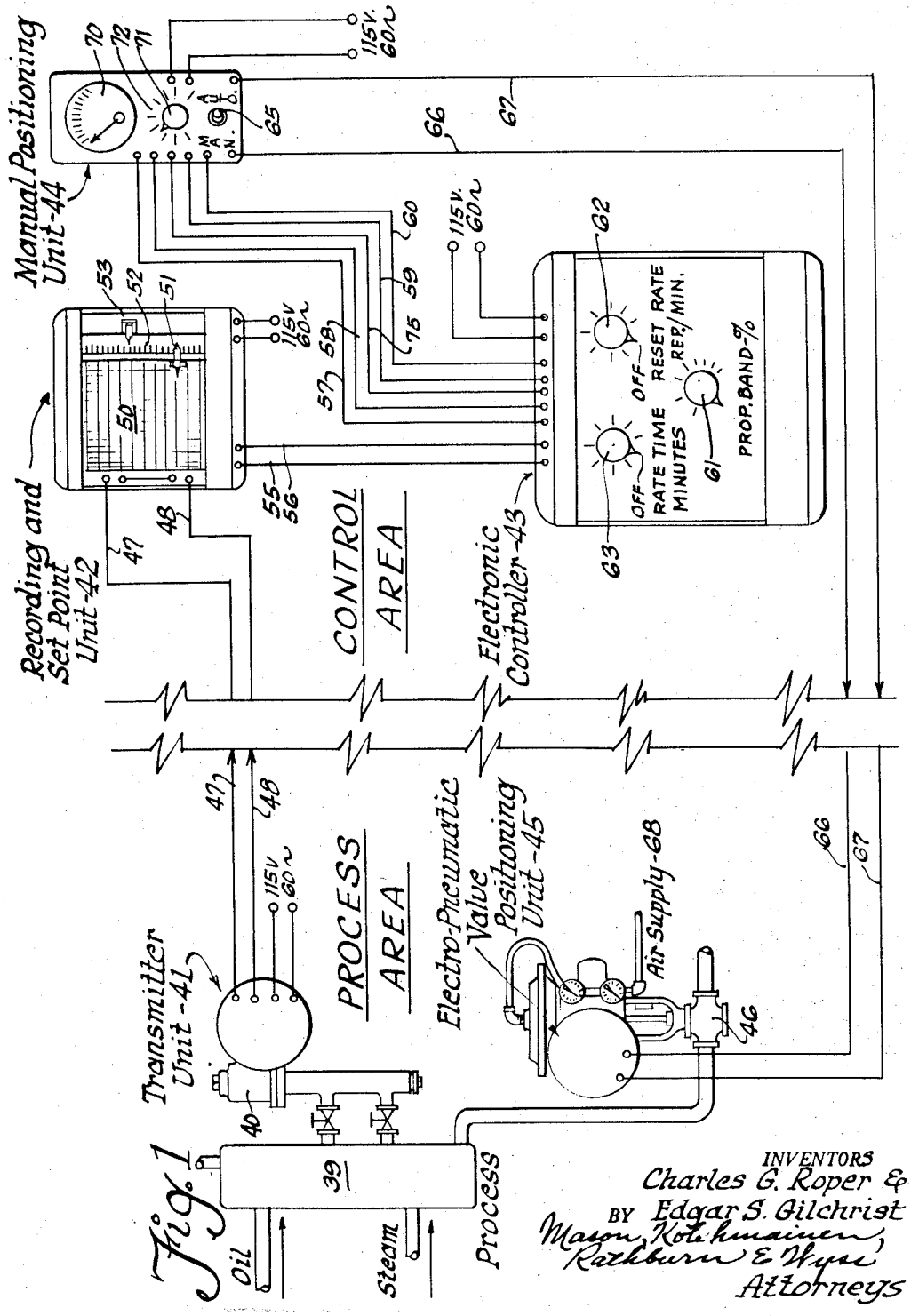
Fig. 1 is a block diagram of an automatic process control system embodying the principles of the present invention.

Referring now to the drawings and more particularly to Fig. 1 thereof, the automatic process control system of the present invention is therein illustrated as controlling a typical industrial process indicated generally at 39. In the illustrated embodiment, the process 39 may comprise a stripping column which is used in a petroleum refining process wherein crude oil is introduced into the top of the column and superheated steam is introduced at the bottom thereof. The admitted steam reduces the partial pressure of the lighter fractions in the crude oil and these lighter fractions are evolved in a vapor which is carried off with the steam, the process being in part controlled by the valve 46 in the oil outlet line. In this connection it will be understood that the process 39 is shown merely for purposes of illustration and the process control system of the present invention may be employed to control any industrial process involving the measurement of process variables and the control of the process in accordance therewith.

In the system of the present invention direct current signals, which are substantially free from fluctuations which are in the frequency range of useful control signals of the system, are transmitted between the process and control areas of the plant so that the transmission lags normally encountered in pneumatic control systems are substantially eliminated. In the illustrated embodiment, the valve 46 is controlled in accordance with changes in the liquid level within the column 39 as determined by a displacement type liquid level measuring device indicated generally at 40. More specifically, the illustrated embodiment of the process control system of the present invention comprises a transmitter unit 41 which is controlled by the liquid level measuring device 40, a recording and set point unit 42, an electronic controller 43, a manual positioning unit 44 and an electropneumatic valve positioning unit 45.

The transmitter unit 41, which is located in the process area, is energized by an unregulated alternating current supply and transmits a direct current signal over the conductors 47 and 48 to the recording and set point unit 42 located in the control area. The process and control areas may be separated by as much as thirty miles without introducing any appreciable transmission time lag. Preferably, the direct current signal which the unit 41 transmits to the unit 42 has a standardized range of from 0.5 to 5.0 milliamperes, and varies within this range in accordance with variations the liquid level within the stripping column 39. The transmitter unit 41 is provided with its own internal feedback loop so that the stability and dynamic response of the unit 41 to changes in liquid level are improved and the unit 41 is rendered less responsive to extraneous disturbances. Also, by providing an independent feedback loop within the transmitter unit 41, the output current thereof remains substantially constant despite wide variations in line length and resistance of the output circuit so that the unit 41 does not have to be calibrated for each installation and may be connected in parallel with the output of another transmitter unit or the input of a control unit without changing the output currents.

The recording and set point unit 42 is also energized by an unregulated alternating current supply and includes a recorder portion which responds to the direct current signal transmitted thereto from the transmitter unit 41 by recording the value of the measured variable on the chart 50. The unit 42 is also provided with a pointer 51, attached to the recording pen of the instrument, which cooperates with the scale 52 to provide an indication of the magnitude of the controlled variable at any instant. In order to set the control point of the process, the unit 42 is also provided with a set point portion which includes a set point indicator 53 which may be manually adjusted to provide the desired set point and the set point portion of the unit 42 functions to develop an error signal on the output conductors 55 and 56 thereof which is proportional to the deviation of the indicator 51, and hence the controlled variable, from the set point as determined by the position of the indicator 53. The recorder and set point portions of the unit 42 are completely independent from one another so that the set point of the system is not disturbed if the recording pen is held or moved accidentally. The recorder portion of the unit 42 is provided with its own separate feedback loop to provide accurate positioning of the recording pen and permit the recorder to respond to relatively high frequency changes in the transmitter output signal.

In order to provide an error signal which is suitable for operation with vacuum tube circuits in the electronic controller 43, the set point portion of the unit 42 converts the variable direct current signal developed by the transmitter unit 41 into a variable voltage error signal which is proportional to the deviation of the process from the set point. Thus, if the recording indicator 51 is at the top of the scale 52 and the set point indicator 53 is at the bottom of the scale 52 a positive error signal of approximately 22.5 volts D.C. is produced between the conductors 55 and 56. On the other hand, if the indicator 51 is at the bottom of the scale 52 and the set point indicator 53 is at the top of the scale, a negative voltage of approximately 22.5 volts D.C. is produced between the conductors 55 and 56. The set point portion of the unit 42 is also provided with an independent feedback loop therein so that a constant voltage output circuit is provided for the transmission of the error voltage between the units 42 and 43. Accordingly, the error voltage between the conductors 55 and 56 is maintained substantially constant with large variations in the impedance of the output circuit thereby permitting several controllers to be paralleled to the output conductors 55 and 56 or a low impedance measuring device to be connected thereacross.

The electronic controller 43 is energized from an unregulated alternating current supply and comprises a balanced differential amplifier which is provided with a proportional band control 61, a reset rate control 62 and a rate response control 63 which may be adjusted to modify the error voltage produced between the conductors 55 and 56 to provide for any desired mode of control of the process. The controller 43 also converts the error voltage developed on the conductors 55 and 56 into a direct current valve positioning signal which is transmitted over the conductors 59 and 60 to the manual positioning unit 44. Preferably, this valve positioning signal has the same standardized range of from 0.5 to 5.0 milliamperes as the transmitter unit 41. The controller 43 is provided with a feedback loop between the output and input of the balanced differential amplifier so that the output current supplied to the conductors 59 and 60 is held substantially constant over a wide range of output impedance. Accordingly the output of the controller 43 may be connected in parallel with the output of a transmitter unit for cascade purposes and the output current of the controller 43 is rendered substantially independent of line length and resistance.

The manual positioning unit 44 is energized from an unregulated alternating current supply and includes a stable direct current source which may be used for manual control. The unit 44 is provided with a manual-automatic changeover switch 65 to permit shifting the system from automatic to manual operation. When the switch 65 is in the automatic position the valve positioning current developed on the conductors 59 and 60 by the unit 43 is transmitted through the unit 44 without modification and over the output conductors 66 and 67 thereof to the electro-pneumatic valve positioning unit 45 which is located in the process area. In the unit 45, the valve positioning current is converted into a corresponding pneumatic control signal which is derived from the air supply line 68, and is employed to actuate the pneumatically controlled final control valve 46 in the proper direction to reduce the error signal to zero. The unit 45 is provided with its own independent feedback loop so that the valve 46 is positioned in precise relationship to the valve positioning current transmitted over the conductors 66 and 67 regardless of stem loading on the valve and variations of pressure in the supply line 68.

In order to change over from automatic to mnaul operation the manual positioning unit 44 is provided with a meter 70, which indicates the value of the valve positioning current transmitted over the conductors 66 and 67 to the valve positioning unit 45, and the manual positioning unit 44 is also provided with a manual positioning control knob 71. The position of the control knob 71 determines the current supplied from the direct current source in the unit 44 to the conductors 66 and 67 when the unit 44 is in the manual position and the control knob 71 cooperates with a scale 72 which is calibrated in terms of the manual control current transmitted over the conductors 66 and 67 when the unit 44 is in the manual position. Accordingly, when it is desired to change over from automatic to manual operation the control 71 is adjusted so that the position of the pointer thereof on the scale 72 matches the needle of the indicating meter 70, after which the changeover switch 65 is thrown to the manual position and the current transmitted over the conductors 66 and 67 is thereafter controlled solely by the position of the manual positioning control 71 and is unaffected by the automatic control components 41, 42 and 43. When it is desired to change back to automatic control the switch 65 is merely thrown back to the automatic position and the process is thereafter controlled in accordance with the position of the set point indicator 53 and the mode of control set up in the electronic controller 43.

In order that the transfer from manual operation back to automatic operation may be made without critical manual adjustments of the controller and manual positioner while at the same time minimizing abrupt variations in valve travel if an error exists on changeover, a control voltage proportional to the setting of the manual positioning control 71 is transmitted over the conductor 75 from the unit 44 to the electronic controller 43. A relay in the controller 43 is energized over the conductors 57 and 58 when the switch 65 is in the manual position so that during manual operation the control voltage on the conductor 75 is impressed upon the controller 43 and continuously readjusts the controller in accordance with the value of the manual control current. In order to minimize valve travel on changeover when the process is not precisely on the set point, the controller is automatically readjusted in a manner not dependent on the position of the proportional band control 61. Accordingly, when it is desired to change from manual to automatic operation the switch 65 is merely thrown to the automatic position and, since the controller 43 is continuously readjusted during manual operation, the maximum valve motion on changeover when an error exists will be one-half the deviation of the process from the set point established by the unit 42, regardless of the setting of the proportional band control 61, and the phenomenon known as "bumping the process" is held to a minimum. Furthermore, valve motion on changeover may be substantially completely eliminated if the switch 65 is thrown to the automatic position at a time when the process is on set point.

It will be evident from the above general description of the system of Fig. 1 that an arrangement is provided in which individual units may be energized from unregulated power lines so that the process can be economically controlled at any desired control area and the operation of an entire plant can be coordinated at one central location. Furthermore, the system of the present invention is particularly adapted to function with conventional analog to digital computers and conventional calculating and punched card machines without increasing the cost or complexity of the process control system so that monitoring and computation operations may be performed at convenient locations without interfering with the process control system, per se. Thus, if it is desired to provide read and print out facilities for the variable measured by the transmitter 41, a small resistor is inserted in series with one of the output conductors 47, 48 so that the direct current transmitter output flows through this resistor. Since conventional analog to digital computers and read out devices are designed to work from low level D.C. voltages, the voltage developed across the series resistor, which will be in the order of millivolts, may be employed directly as the input signal for the monitoring device. Also, since the output current from the transmitter is stabilized, a large number of output signals may be derived for different ancillary functions without changing the value of the transmitter output current. In the alternative, a large number of transmitters, each measuring a different variable may be scanned successively by means of a suitable switching arrangement for connecting the series resistors of successive transmitters to the input of the monitoring or calculating device.

It will also be noted that in the system of Fig. 1 the input and output conductors to the control area may be connected to different potentials while permitting the transmission of a direct current signal through the system. With this arrangement the input conductors 47, 48 may be connected to a different potential than the output conductors 66, 67 without interfering with the operation of the system. For example, in many installations it is desirable to use leased telephone lines for the transmission of signals between the process and the control areas. Accordingly, either the input conductors or the output conductors, or both, may be connected to telephone lines running between the process and control areas on which different potentials appear due to the telephone system itself and the transmission of direct current signals through the process control system is unaffected. It will also be noted that one conductor between the process and control areas may be used as a common conductor for a large number of input or output direct current signals so that a substantial saving in installation and maintenance is achieved with the electrical transmission system of the present invention.

Figure 2:
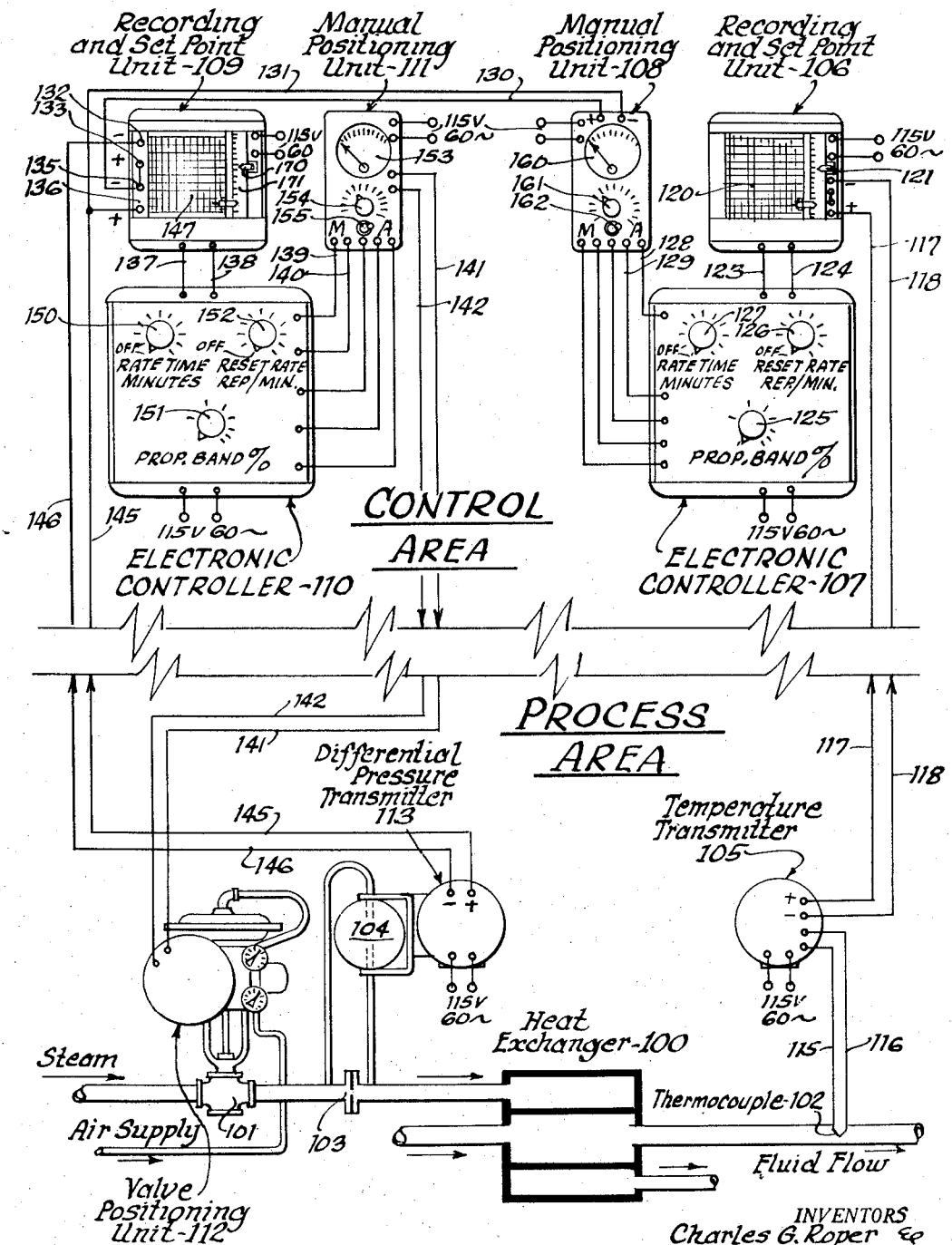
Fig. 2 is a block diagram of an alternative process control system embodying the principles of the invention wherein more precise control is obtained by using a second set of control components to reduce the variations of the controlled variable of the process.
Figure 25:
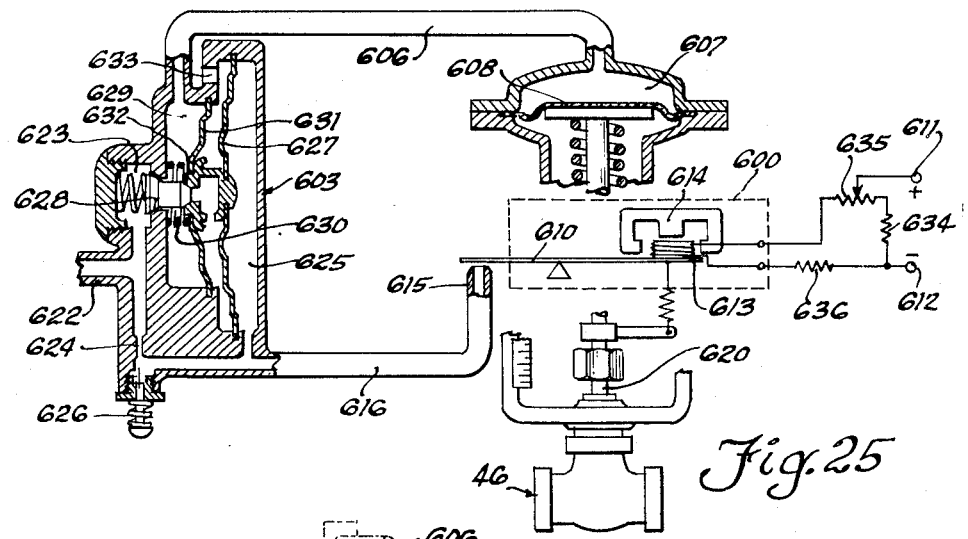
Fig. 25 is a somewhat diagrammatic view of the valve positioning unit of Fig. 24 showing the operation thereof.
Figure 24:
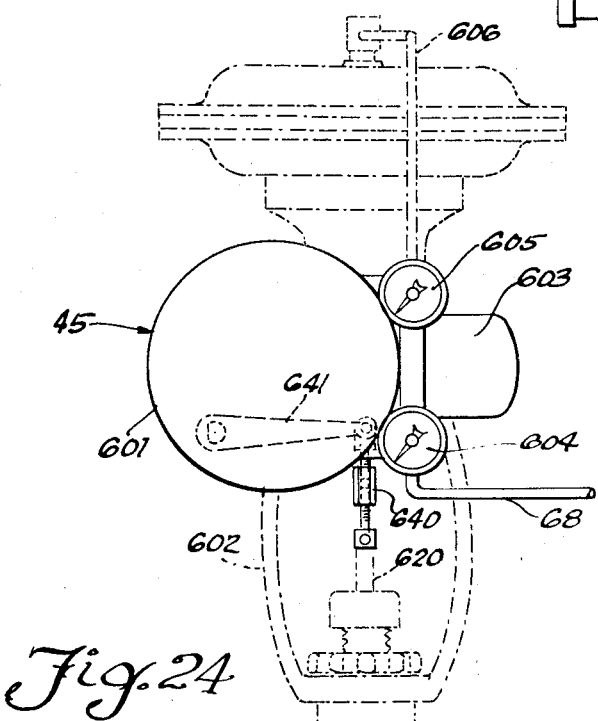
Fig. 24 is a side elevational view of the valve positioning unit in the system of Fig. 1 shown in conjunction with a typical valve.
Figure 28:
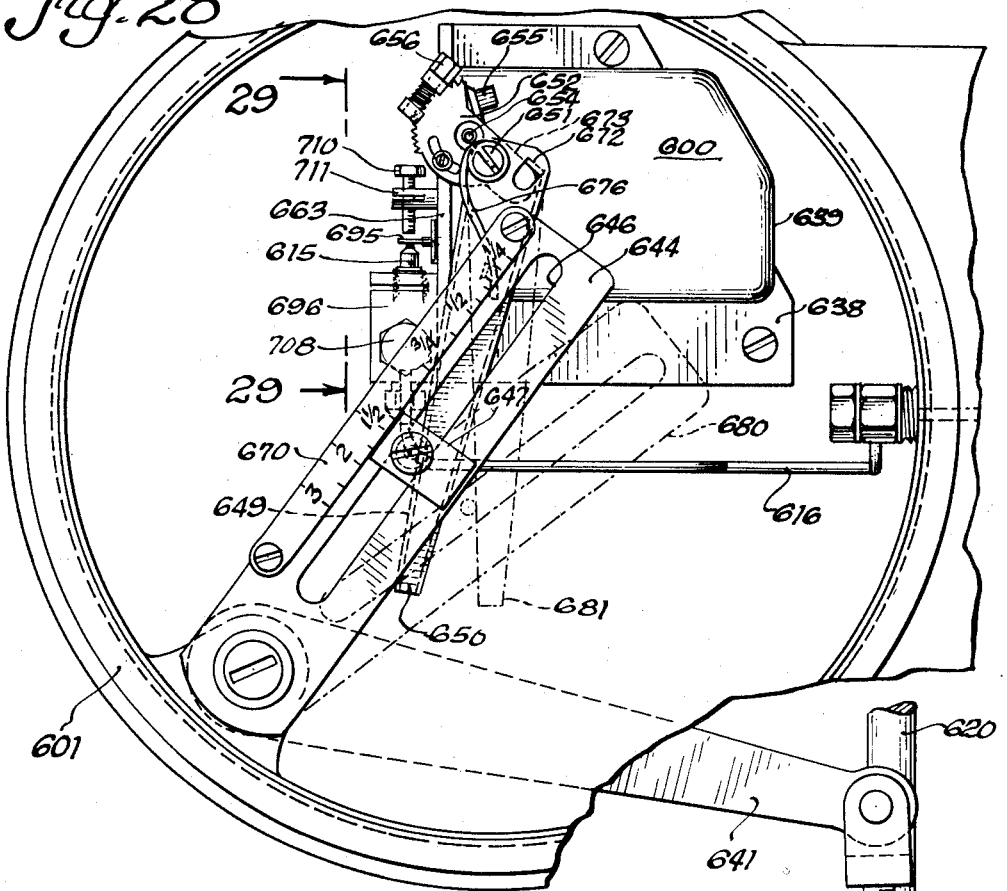
Fig. 28 is a side elevational view of a portion of the valve positioning unit of Fig. 26 on a somewhat larger scale.
Figure 29:
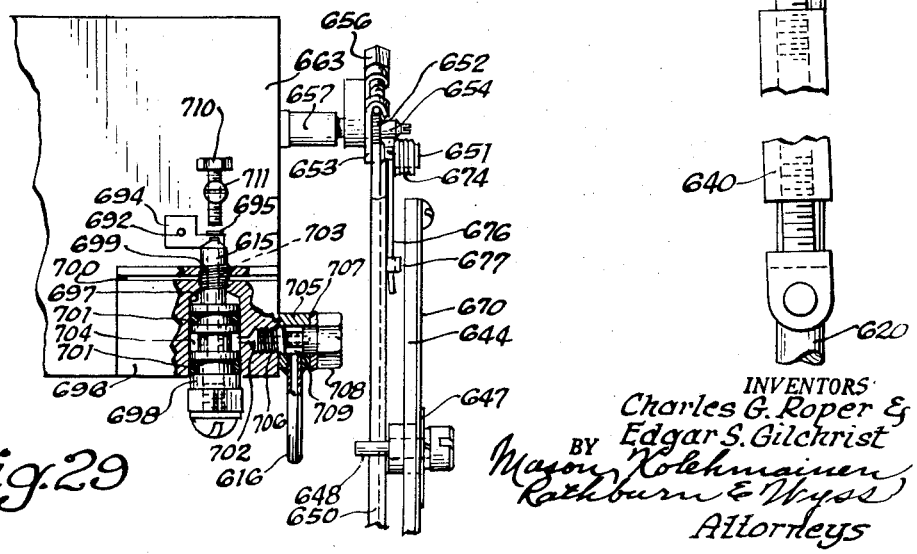
Fig. 29 is a fragmentary side elevational view taken along the line 29—29 of Fig. 28.

In order to illustrate the flexibility and versatility of the component units of the automatic process control system of the present invention there is shown in Fig. 2 an alternative process control system wherein cascade control of two variables of the system is provided. In the system illustrated in Fig. 2, a typical process control system has been shown wherein the control agent of the process is steam which is employed to apply heat to the process fluid by means of the heat exchanger 100. The amount of steam entering the heat exchanger 100 is controlled by the valve 101 and the temperature of the process fluid is measured by means of the thermocouple 102 which is placed in the outlet process fluid line of the heat exchanger 100, the thermocouple 102 being included in the major control loop of the process. The process also includes a minor control loop which includes the orifice 103 in the steam inlet line and the differential pressure cell 104 which are employed to detect changes in the steam flow rate so that the process is controlled both as to the amount of heat added to the control medium and the flow rate of the control agent i.e., incoming steam. The major control loop of the process includes a temperature transmitter 105, a recording and set point unit 106, an electronic controller 107, a manual positioning unit 108, a recording and set point unit 109, an electronic controller 110, a manual positioning unit 111 and an electro-pneumatic valve positioning unit 112, the unit 112 functioning to position the pneumatically controlled valve 101 in the steam inlet line. The units 109, 110, 111 and 112 are common to both control loops of the process and the minor control loop also includes a differential pressure transmitter 113 which is connected over the conductors 145 and 146 to the recording and set point unit 109. The units 106 to 112, inclusive, may all be substantially identical to the corresponding units in the system of Fig. 1. However, in the system of Fig. 2 the component units are interconnected in a somewhat different manner to provide for cascade control of the process.

The temperature transmitter 105 which is energized from an unregulated alternating current supply, receives an electrical signal from the thermocouple 102 over the conductors 115 and 116 and converts the thermocouple input into the standard transmitter signal of the system, i.e., a direct current signal within the range of from 0.5 to 5.0 milliamperes. This transmitter signal is transmitted over the conductors 117 and 118 to the recording and set point unit 106 which is located in the control area. In the unit 106 the value of the measured variable i.e., the temperature of the process fluid is indicated on the chart 120 and the major set point of the system may be adjusted by moving the set point indicator 121 of the unit 106. The unit 106 develops an error voltage signal between the conductors 123 and 124 thereof which is proportional to the deviation of the process from the established set point and is transmitted over these conductors to the electronic controller 107. The controller 107 is provided with a proportional band control 125, a reset rate control 126 and a rate time control 127 so that any desired mode of control of the temperature of the process fluid may be set up and the controller 107 transmits a valve positioning current over the conductors 128 and 129 to the manual positioning unit 108. When the unit 108 is in the automatic position this valve positioning current is transmitted over the conductors 130 and 131 to the recording and set point unit 109. More particularly, the valve positioning current developed by the electronic controller 107 is connected by way of the conductors 130 and 131 to the set point input terminals 135 and 136 of the unit 109 so that this valve positioning current acts as an electrical set point signal for the set point portion of the unit 109 but does not affect the recording portion of the unit 109.

The differential pressure transmitter 113, which is energized from an unregulated alternating current supply, is controlled in accordance with the position of the output shaft of the differential pressure cell 104 and transmits a direct current signal, which varies within the standard range of from 0.5 to 5.0 milliamperes, over the conductors 145 and 146 to the recording and set point unit 109 in the control area. The transmitter 113 is provided with an independent feedback loop therewithin so that the output current thereof is stabilized against load circuit variations. The direct current signal from the transmitter 113 is connected to the terminals 132 and 136 of the unit 109 so as to be applied to both the recording and set point portions of the unit 109 in series. As a result, variations in the rate of flow are recorded on the chart 147 in the unit 109 and the set point portion of the unit 109 responds to the direct current signals from the units 108 and 113 which are connected in opposition across the set point input terminals 135 and 136.

The controller 110 is provided with a proportional band control 151, a reset rate control 152 and a rate response control 150 and functions in a manner similar to the controller 107 to convert the error signal developed by the unit 109 into a corresponding valve positioning current which is transmitted over the conductors 139 and 140 to the manual positioning unit 111. When the changeover switch 155 in the unit 111 is in the automatic position this valve positioning current is transmitted over the conductors 141 and 142 to the valve positioning unit 112 in the process area. Accordingly, the position of the valve 101 is controlled in such manner as to provide a flow rate corresponding to the value of the output current from the manual positioning unit 108. Preferably, the set point indicator 170 of the unit 109 is moved to a position below the zero point of the scale 171 which corresponds to zero current input. In the illustrated embodiment wherein a current range of 0.5 to 5.0 milliamperes is used, the set point indicator 170 would be moved to a point approximately 11% below the zero point of the scale 171. When the set point indicator 170 is in this position, the electrical signal from the controller 107 corresponds to the rate of flow through the valve 101 since the unit 109 does not introduce any mechanical set point component. Accordingly, when the indicator 170 is in the described position, the meter 160 in the manual positioning unit 108, through which the output current from the controller 107 flows, provides a direct and continuous indication of the set point of the minor control loop. Thus, if the meter 160 reads half scale the operator is informed that a 50% flow rate is being maintained. Since the set point indicator 121 in the unit 106 also continuously indicates the set point of the major control loop it will be evident that the system of Fig. 2 provides continuous indications for all set points in a cascade control system.

In the system of Fig. 2 the major control loop normally functions so that the rate of steam flow produces the desired temperature and this flow is adjusted by means of the valve 101 in accordance with the setting of the set point indicator 121. However, changes in the steam pressure head due to outside demands and other similar disturbances in the steam inlet line may introduce errors in the control of the process since the temperature control arrangement of the major control loop will not respond quickly enough to these short time fluctuations. Accordingly, the minor control loop which includes the transmitter 113, the recording and set point unit 109, the electronic controller 110 and the manual positioner 111, is provided to improve the time response and accuracy of flow adjustment so that the effects of changes in steam pressure head are substantially reduced. In effect, the minor control loop comprises a means for improving the performance of the flow rate adjustment which is itself a series component in the major control loop of the system. Since the transmitter 113 serves as the feedback element in the minor control loop, the response to changes in steam pressure head will be limited only by the dynamic response of the unit 113 and the adjustment of flow rate by the major control loop will be performed in accordance with temperature variations of the process and substantially independently of variations of flow rate due to outside disturbances.

If it is desired to change over the major loop to manual control, the manual positioning control 161 in the unit 108 is matched to the needle position of the meter 160 and the changeover switch 162 is actuated to the manual position. When this occurs, the minor control loop assumes control insofar as automatic operation is concerned so that the units 105, 106 and 107 in the major control loop may be removed for service or repair. During this period the set point portion of the unit 109 automatically controls the process solely in accordance with changes in the steam flow rate. If both major and minor loops are to be removed, the manual positioning control 154 in the unit 111 is matched to the needle position of the meter 153 and the changeover switch 155 is thrown to the manual position so that all of the units except the units 111 and 112 are rendered ineffective to control the process. However, when the system is changed back to automatic operation each of the controllers 107 and 110 is controlled by the associated manual positioning unit so that abrupt variations in valve movement are held to a minimum in the event that set point errors exist, as described in detail heretofore in connection with the system of Fig. 1.

It will be noted that in the system of Fig. 2 the output of the transmitter 113 is connected in parallel with the output of the controller 107 across the set point input terminals 135, 136 of the unit 109. However, both of the units 113 and 107 are provided with internal current stabilizing feedback loops so that the output current of each unit is not affected by the loading of the other unit and cascade connection of control units may be made. Furthermore, since the input and output signals of the system are both direct current signals of the same standardized range of current values, several control loops may be cascaded directly without requiring separate converting units between control loops of the system. It will also be noted that in the system of Fig. 2 the output current from the controller 107 may be applied directly to the input of the set point portion of the unit 109 and acts as an electrical reference level therefor. In this connection, it will be understood that the cascade system shown in Fig. 2 may be expanded to include control of one or more additional variables, which may be in entirely different areas than the transmitters 105 and 113, and by providing overall feedback loops in each control loop additive time lags are avoided so that the accuracy of control is greatly increased.

*Transmitter unit 41*

Considering now, in more detail, the transmitter unit 41 of the system shown in Fig. 1 reference may be had to Figs. 4 to 11, inclusive, of the drawings, wherein the details of the unit 41 are shown, and to Fig. 3 of the drawings wherein the electrical circuit diagram of the unit 41 is shown. Referring more particularly to these figures, the unit 41 comprises an electromechanical balance unit indicated generally at 200 which is mounted on the sub-chassis 201 within an explosion-proof case 202 provided with a threaded cover 203. The output shaft 205 of the liquid level measuring device 40 is rotatably mounted in one wall of the housing 202 by means of the bushing 206 and as the liquid level within the stripping column changes the inner end 207 of the shaft 205 is rotated in proportion thereto. The shaft 205 is connected by means of a zero and span adjustment linkage indicated generally at 208 (Fig. 6) to the input shaft 209 of the electromechanical balance unit 200 so that the shaft 209 is rotated in proportion to rotation of the input shaft 205.

Considered generally, the electromechanical balance unit 200 comprises a resiliently mounted metallic beam 210 (Fig. 10) which is deflected by rotation of the input shaft 209 thereof. More particularly, the shaft 209 is rotatably mounted in the bushing 232 which is mounted on the base 251 of the balance unit 200 and the shaft 209 is biased by means of the spiral return spring 233 the other end of which is secured to the post 234 on the base 251 and the inner end of which is secured to the shaft 209. A stop pin 241 is secured to the inner end of the shaft 209 and is adapted to engage the post 234 and prevent overtravel of this shaft. The inner end of a spiral calibration spring 242 is secured to the shaft 209 and the outer end of the spring 242 is connected through the twisted arm 243 to the beam 210. Accordingly, as the shaft 209 is turned, the spring 242 produces a corresponding torque on the beam 210 tending to deflect the same. Deflection of the beam 210 causes the end portion 211 thereof to move toward a spiral wound planar inductor 212 which is connected to the input circuit of a high frequency oscillator so as to vary the tuning thereof. The end 211 of the beam 210 carries on the underside thereof a disk of insulating material 213 to which is secured a self-supporting single layer solenoid-wound coil 214 which is positioned within an annular air gap 215 formed in a permanent magnet structure which includes a central pole piece 216, the end plates 217 and 218, and a toroidal member 219 of magnetic material which are assembled in the manner shown in Fig. 10 to define the annular air gap 215. A feedback current proportional to the oscillator output current is applied to the coil 214 in the correct polarity to deflect the beam 210 in opposition to the input torque which is applied to the beam through the input shaft 209. Accordingly, the position of the beam 210 varies only by an amount sufficient to produce a change in the oscillator output current which is of sufficient magnitude to offset the torque input applied to the beam 210 and rebalance the beam.

Considering now the manner in which the beam 210 is resiliently supported on the upper end plate 217 of the magnet structure, a crossbar 220 is spaced above the end plate 217 by means of the spacers 221 and 222 and the bar 220 is provided with the notched portions 223 and 224 so as to permit the center portion of the bar 220 to be twisted out of the plane of the end portions of the bar 220. A transversely extending member 225 is clamped between the middle portion of the crossbar 220 and an upper plate 226 by means of the screws 227 and 228 and is provided with a down turned edge portion 229 to the ends of which are secured the flat resilient supporting strips 230 and 231 which comprise the sole supporting elements for the beam 210. The bottom ends of the strips 230 and 231 are secured to the ends of a transversely extending member 235 which is secured to the central portion of the beam 210 as is best illustrated in Fig. 10.

The position of the central portion of the bar 220 may be varied by means of the adjusting screw 236 which threads through the bar 220 and engages the upper surface of the end plate 217 so that the center portion of the bar 220 may be twisted by the desired amount by means of the screw 236. Also, the position of the member 225 between the bar 220 and the clamping plate 226 may be varied as desired so as to provide an initial adjustment of the beam 210 relative to the permanent magnet structure so that the coil 214 may be centered within the air gap 215 in the floating position of the beam 210. The beam 210 is counterbalanced by means of the counterweight 237 which is secured to the right hand end of the beam as viewed in Fig. 10, and a bracket 238 is provided adjacent the weight 237 which carries a horizontal balance adjusting screw 239 and a vertical balance adjusting screw 240. The positions of the screws 239 and 240 relative to the horizontal and vertical axes of the beam 210 may be varied by threading the same through the bracket 238 by the desired amount so that the beam is dynamically balanced in both axes. With this arrangement the electromechanical balance unit 200 may be used in any position without changing the floating position of the beam or the calibration thereof.

The planar inductor 212 is adjustably positioned above the end 211 of the beam 210 on a block 245 of insulating material which is supported on the screws 246 which extend upwardly from the end plate 217 of the magnetic structure, the U-shaped spring clips 247 being employed to bias the block 245 upwardly against the adjustment nuts 248 on the ends of the screws 246. The ends of the coil 212 are connected to the terminals 249 and 250 which extend through the base plate 251 of the electromechanical balance unit 200. A cover 252 encloses the components of the balance unit and is secured to the base member 251 by any suitable means so that a completely enclosed, dust proof unit is provided.

Considering now the details of the linkage 208 which is used to connect the input shaft 207 to the shaft 209 of the balance unit 200, this linkage comprises a motion transmitting arm 255 (Fig. 5) having an offset portion 256 which is clamped to the end 207 of the input shaft 205 and is provided with an offset portion 257 at the other end thereof which is connected to a span adjustment linkage including the upper link 258 and the lower link 259 which are adjustably connected together by means of the lock screw 260 so that the length of the span adjustment link may be varied. On the other end of the input shaft 209 there is provided a clamping plate 261 which is secured to the shaft 209 by means of the lock screw 262 and a toothed segment 263 may be rotated with respect to the plate 261 by means of the adjustment screw 264 and is locked in position by means of the lock screw 265. A slide 266 is positioned on the segment 263 by means of the guide screws 267 and 268 and the slide 266 is provided with an offset portion 269 which is connected to the lower end of the span adjustment link 259.

From the foregoing description of the linkage 208 it will be seen that as the input shaft 207 is moved in accordance with changes in the measured variable, which, in the illustrated embodiment, is the liquid level of the process, the offset end portion 257 of the arm 255 is rotated in an arc about the shaft 207 and this motion is transmitted through the span adjustment linkage 258, 259 to the slide 266 so that the input shaft 209 of the balance unit 200 is rotated in proportion thereto. In this connection it will be seen that due to the offset portion of the slide 266 the motion transmitting linkage may be rotated through a substantial arc to accommodate a wide range of input shaft movement. Adjustment of the link 258, 259 determines the starting angle and hence linearity while the slide 266 may be adjusted with respect to the segment 263 at the factory to provide a coarse span adjustment of the instrument so that a standard input shaft movement produces the correct arcuate movement of the input shaft 209. In addition the zero position of the linkage may be adjusted by means of the adjustment screw 264 so that in the zero position of the input shaft 205 the input shaft 209 of the balance unit 200 is in the correct position to balance the beam 210.

Considering now the electrical circuit arrangement of the transmitter unit 41 shown in Fig. 3 of the drawings, the oscillator comprises the left hand section of a dual triode vacuum tube 275, preferably of the commercial type 12AU7. An unregulated alternating current supply which is connected to the line input terminals 276 and 277 energizes the power transformer 278 and the right hand section of the tube 275 functions as a rectifier so as to develop a unidirectional supply voltage of the polarity indicated across the condenser 279. This supply voltage is coupled through the oscillator tuning inductance 280 to the plate of the left hand section of the tube 275 and the cathode of this section is connected through the resistor 281 to the negative side of the condenser 279. A pair of resistors 282 and 283 are connected in series across the condenser 279 so that a bridge circuit is formed with the oscillator tube forming one arm of the bridge, the other arms of this bridge comprising the resistors 281, 282 and 283. The planar inductor 212 is connected across the tuning condenser 285 and the upper end thereof is coupled through the condenser 286 to the control grid of the oscillator tube, a grid leak resistor 287 being connected between the grid and cathode of this tube. The resulting circuit is well known in the art as the tuned-grid, tuned-plate oscillator in which the small capacitance between the grid and plate of the triode vacuum tube provides the required regenerative coupling between plate and grid circuits.

The beam 210 is deflected in accordance with the movement of the input shaft 209 and the position of the end 211 of the beam 210 with respect to the coil 212 is varied so as to change the tuning of the oscillator. Variation of the tuning of the oscillator changes the average bias established by the condenser 286 so that the average plate circuit impedance of the oscillator tube is changed and the balance condition of the above described bridge circuit is altered. The transmitter output current signal is derived from the above described bridge circuit by connecting one of the output terminals 290 to the junction of the resistors 282 and 283 and connecting the cathode of the oscillator tube through a resistor 291 and the upper portion of a potentiometer 292 to the arm 293 thereof which is connected to ground, the other output terminal 294 being also connected to ground. Accordingly, the transmitter output current flows through the resistor 291, the upper portion of the potentiometer 292, the output device connected across the terminals 294 and 290 to the junction of the resistors 282 and 283. For some applications it may be desirable to connect the output terminals 294 and 290 to an existing circuit, such as a leased telephone line, for example, for transmission to the control area. In such applications the terminal 294 and the arm of the potentiometer 293 are not connected to ground so that the transmitter output current is unaffected by any potentials due to the telephone system which may be present on the output conductors 47, 48.

In order to stabilize the current output signal against changes in load resistance and to provide an arrangement which is insensitive to line voltage variations and changes in tube characteristics, a feedback current is derived from the above described bridge circuit and is applied to the coil 214 in the correct polarity to apply a torque to the beam 210 in opposition to the input torque applied through the shaft 209. When a large feedback factor is employed the electromechanical balance unit 200 is made considerably more stable and the transmitter unit may be operated from an unregulated supply without producing changes in the output signal due to fluctuations in line voltage. More particularly, the upper end of the feedback coil 214 is connected to the cathode of the oscillator tube and the lower end of the coil 214 is connected through a resistor 296, a potentiometer 297 and a resistor 298 to the bottom end of the potentiometer 292. Preferably, the values of the resistor 291 and the potentiometer 292 are relatively small as compared to the values of the resistors 296 and 298 and the potentiometer 297 so that the major portion of the output current flows through the resistor 291 and the upper portion of the potentiometer 292. With this arrangement, the current flowing through the feedback coil 214 may be adjusted as desired to provide an electrical span adjustment for the transmitter unit 41 which may be adjusted independently of the mechanical span adjustment described above, the shaft 299 of the potentiometer 297 being accessible when the cover 203 is removed so as to simplify calibration of the instrument. Also, the resistors 291, 296 and 298 and the potentiometers 293 and 297 are all of a low temperature coefficient type so that the effects of temperature on the calibration spring 242 are compensated as will be described in more detail in connection with a similar compensation network in the unit 42.

In accordance with an important feature of the invention, the transmitter unit 41 is provided with a calibrated adjustment to permit manual setting of the instrument to the specific gravity of the liquid level being measured. More particularly, the potentiometer 292 is employed as a specific gravity control and the pointer knob 300 thereof cooperates with the scale 301 which is calibrated in terms of the specific gravity of the liquid. In this connection it will be understood that a manually adjustable specific gravity control is particularly desirable in processes where the level of the interface between liquids of two different specific gravities is to be measured. In calibrating the transmitter unit 41 to a particular specific gravity, the pointer knob 300 is set to the specific gravity of the liquid to be measured as indicated on the specific gravity scale 301. At zero liquid level, the transmitter output current is adjusted to 0.5 milliampere by means of the zero adjustment screw 264 on the shaft 209 of the electromechanical balance unit 200. With the displacer at maximum liquid level the transmitter output current is adjusted to 5.0 milliamperes by turning the slotted shaft 299 of the potentiometer 297 so that the span of the transmitter unit 41 is calibrated to the span of the liquid level displacer unit 40.

From the foregoing description it will be evident that variation of the arm of the potentiometer 292 changes the value of the resistance included in series with the output terminals 294 and 290 so that the instrument 41 may be calibrated to the standard output current range of 0.5 to 5.0 milliamperes with the different ranges of input movement which are obtained with liquids of different specific gravities. In this connection, it will be understood that the differential pressure transmitter 113 in the system shown in Fig. 2 may be substantially identical to the transmitter 41 except for the above described specific gravity control network since both these units function with a mechanical input signal and provide the same standard range of current output.

*Recording and set point unit 42*

As described heretofore in connection with the general operation of the process control system of the present invention, the recording and set point unit 42 performs the dual function of recording the value of the process variable and setting the control point for process control of the system. Referring now to Figs. 12 to 19, 21 and 22 of the drawings, the components of the recording and set point unit 42 are mounted on separate chassis which are secured to a vertical frame 350 which is slidably positioned within a casing 351 provided with the hinged front cover 352 which may be opened to permit positioning of the set point indicator 53.

Considered generally, the recorder portion of the unit 42 comprises an electrochemical balance 355 which is mounted on the vertical frame 350, a rotary solenoid 356 which is mounted on a sub-chassis 357 secured to the frame 350 and a vertical scale, card chart driving mechanism 358 which is also mounted on the sub-chassis 357. The rotary solenoid 356 is energized by the balance unit 355 and its associated oscillator circuit and is connected to the recording lever 360 through the link 361 so that the recording pen 362 is moved vertically over the chart 50 in accordance with the lever of the current input signal transmitted to the unit 42 from the transmitter 41. The recording lever 360 is also connected through the linkage 363 and 364 to the input shaft 365 of the balance unit 355 so as to apply a mechanical feedback signal to the unit 355. The lever 360 is pivotally connected to the vertical arm 366 (Fig. 16) which is secured to a bracket 367 mounted on the vertical frame 350 by means of the thin resilient element 368 so that rotary motion of the link 361 which is produced by the rotary solenoid 356, results in substantially straight line motion of the recording pen 362. The zero position of the recording pen 362 may be adjusted by means of the coarse zero adjustment 369 and the fine zero adjustment 370 so that the recorder unit may be calibrated mechanically to the standard current input signal.

Considered generally, the set point portion of the unit 42 comprises an electromechanical balance unit 371 which is mounted on the vertical frame 350, the electrical circuit components for the balance unit 371 being mounted on a separate sub-chassis 372 which is also mounted on the frame 350. The set point lever 373 which carries the set point indicator 53 at the forward end thereof is pivotally connected at 374 to the vertical arm 375 which is supported from the bracket 367 by means of the thin resilient element 376. The rear end of the lever 373 is connected through the linkage 377 and 378 to the input shaft 379 of the balance unit 371 so as to position the same in accordance with the position of the set point indicator 53. The zero position of the set point lever 373 may be adjusted by means of the coarse adjustment 380 and the fine adjustment 381 in a manner to be described in more detail hereinafter.

In order to adjust the position of the set point indicator 53 with respect to the scale 52 so as to determine the control point of the process, there is provided a worm screw 385, which is vertically mounted behind the scale 52, and the set point lever 373 is provided with an offset end portion 386 which rides against the threads of the screw 385. The set point indicator 53 is secured to an extension arm 387 which is set resiliently connected to the set point lever 373 by means of the flexible element 388 and the extension arm 387 carries a bracket 389 which is provided with a U-shaped notch in the end thereof adapted to engage the threads of the screw 385 in the normal position of the arm 387. A stop arm 390 is rigidly connected to the end of the set point lever 373 and extends outwardly adjacent the extension arm 387. With this arrangement the position of the set point lever may be set approximately to the desired control point when the front cover of the instrument is open by grasping the extending portions of the members 387 and 390 and pressing them together so that the notched bracket 389 is disengaged from the screw 385 and the lever 373 may then be moved vertically up or down to the desired control point. The bracket 389 will reengage the threads of the screw 385 when the members 387 and 390 or released. The position of the set point lever 373 may be adjusted accurately by means of the knurled knob 391 which is positioned on the bottom end of the worm screw 385 and is accessible when the front cover of the instrument is open. Preferably, one full revolution of the knob 391 causes the set point indicator 53 to move approximately 1% of full scale so that a fine adjustment of the set point may be made after the indicator 53 is adjusted approximately to the desired set point by moving the lever directly in the manner described above.

Considering now, the details of the coarse and fine zero adjustment provided in the recording and set point linkages, it will be understood that the coarse and fine zero adjustment 369 and 370 of the recorder linkage are substantially identical to the coarse and fine zero adjustments 380 and 381 of the set point linkage so that only one set of adjustments need be described in detail. In Figs. 19, 21 and 22 there is shown the details of the coarse and fine zero set point linkage adjustments and, referring to these figures, it will be seen that the input shaft 379 of the set point balance unit 371 carries the toothed bushing 395 on the end thereof which is press fitted on the end of the shaft 379 and carries the bracket 396 thereon. The bracket 396 is held in place by means of a spring washer 397 which is positioned beneath the collar 398, and an adjusting gear 399 is mounted on the bracket 396 with the teeth thereof engaging the teeth of the bushing 395. Accordingly, as the gear 399 is rotated the angular position of the bracket 396 with respect to the shaft 379 may be varied to provide a coarse zero adjustment of the linkage. The other end of the bracket 396 is pivotally secured to the lever 378 by means of the rivet 400 and a transversely extending adjusting screw 401 is mounted on the end of the lever 378 and threads through a block 402 secured to the end of the bracket 396. With this arrangement the adjusting screw 401 may be rotated by means of the knurled head 403 thereof so that the lever 378 pivots about the rivet 400 to provide a fine zero adjustment of the set point linkage.

Considering now in more detail the balance units 355 and 371 and the electrical circuit components associated therewith, reference may be had to Fig. 20 of the drawings wherein the electrical circuit diagram of the unit 42 is shown. Referring to this figure, the transmitter input current, which is transmitted over the conductors 47 and 48 from the unit 41, is applied to the input terminals 420 and 423 of the unit 42, the intermediate terminals 421 and 422 being connected together externally of the unit so that the input circuits of the recorder and set point portions of the unit 42 are connected in series.

With regard to the recorder portion of the unit 42 the electrical circuit arrangement thereof is similar in many respects to the corresponding unit shown and described in detail in the copending application of Charles G. Roper, Serial No. 304,125, which was filed on August 13, 1952, now U.S. Patent No. 2,702,381, which issued on February 15, 1955, and is assigned to the same assignee as the present invention, and reference may be had to this copending application for a detailed description of the electrical operation thereof. However, for the purposes of the present invention, it may be stated generally that the electromechanical balance unit 355 comprises a resiliently mounted beam 425 adjacent one end of which there is provided a planar inductor 426 which varies the tuning of a high frequency oscillator including the tubes 427 and 428. The beam 425 carries an input coil 429 and a feedback coil 430 which are positioned within the air gap of the permanent magnet structure 431. With regard to the mechanical arrangement of the balance unit 355 it will be understood that this unit may be substantially identical to the electromechanical balance unit 200 in the transmitter 41, with the exception that both the input coil 429 and the feedback coil 430 are mounted on the displaceable beam in the balance unit 355. A portion of the input current applied to the terminals 422 and 423 flows through the input coil 429 so as to produce a deflection of the beam 425 in proportion thereto. For a given current input the beam is balanced by the equal and opposing forces produced by the input current flowing through the coil 429 and the sum of the mechanical feedback force applied through the input shaft 365 of the balance unit 355 to the beam 425 and the force produced by any current flowing through the coil 430.

When the input current changes, the beam is deflected and the inductance of the coil 426 is varied so as to change the tuning of the oscillator and the output current of the oscillator, which flows through the field winding 435 of the rotary solenoid 356, is correspondingly varied. Accordingly, the armature 436 of the solenoid 356 assumes a new position in accordance with the oscillator output current so that the recording lever 360 is positioned in accordance with the value of the input current from the transmitter 41. Since the recording lever 360 is mechanically connected by means of the above described linkage to the input shaft 365 of the balance unit 355, the armature 436 rotates until the spring loading on the beam 425 equals the force applied thereto by the new input current level and the beam is again brought to a balanced condition.

The current flowing through the field winding 435 of the rotary solenoid 356 is partially filtered by means of the filter condenser 437. However, in order to reduce the effects of static friction on the linkage connecting the armature 436 to the recording lever 360, a resistor 438 is connected in series with the condenser 437 so as to provide a slight ripple in the current flowing through the field winding 435. The value of the resistor 438 is so chosen that a slight vibration of the armature 436 is produced which overcomes the effects of static friction but is not of sufficient amplitude to affect the operation of the recording pen 362.

The input shaft 365 of the balance unit 355 is connected to the beam 425 thereof by means of a calibration spring in a manner similar to that described in detail above in connetcion with the balance unit 200 in the transmitter 41. As the ambient temperature rises, the calibration spring becomes weaker and accordingly introduces an error in the positioning of the recording lever 360. In order to compensate for changes in the strength of the calibration spring due to temperature variations, a compensating network is provided which includes the resistor 440, a potentiometer 441 and the resistor 442 which are connected in series across the input coil 429 and a copper shunt resistor 446. The input current is applied between the arm of the potentiometer 441 and the bottom end of the resistor 440. The resistors 440 and 442 and the potentiometer 441 are all of the low temperature coefficient type so that the values thereof do not change appreciably with temperature. However, the resistance of the coil 429 and the shunt resistor 446, which are comprised of copper wire, etc., increases with temperature. As the temperature increases, the currents flowing through the coil 429 and the resistor 446 decrease since their resistance values increases while the other resistances of the compensating network remain the same, and by properly proportioning the resistances of the compensation network, the current decrease in the input coil 429 for a given temperature increase can be made to exactly compensate for the weakening of the calibration spring within the balance unit 355. Thus, if the total series resistance of the resistors 440 and 442 and the potentiometer 441 is proportioned with respect to the combined parallel resistance of the coil 429 and resistor 446 in the same ratio as the temperature coefficient of copper is to the temperature coefficient of Phosphor bronze calibration spring, an exact compensation for temperature variations may be made. Furthermore, this compensation is independent of the range adjustment which is provided by adjusting the arm of the potentiometer 441 so that the span of the instrument may be adjusted while maintaining the above described temperature compensation. In this connection it will be understood that at higher temperatures the permanent magnet structure 431 becomes slightly weaker so that it is necessary to take this into consideration in choosing the above described ratio for the compensating network.

The mechanical feedback force applied to the input shaft 365 of the unit 355 functions to stabilize the operation of the recorder. However, due to friction within the feedback linkage, hysteresis effects in the rotary solenoid 356 and inertia effects of the system, hunting of the system may be produced which causes undesired vibrations of the recording pen 362. In order to eliminate hunting, a second feedback force, which is proportional to the rate of change of the output current flowing through the field winding 435, is applied to the beam 425. More specifically, a feedback coil 445 is wound on the core of the solenoid 356 and the voltage produced thereacross is coupled to the feedback coil 430 mounted on the beam 425. Accordingly, when the current through the field winding 435 changes, a current proportional to the rate of change of the field current is applied to the feedback coil 430 so as to apply a second feedback force to the beam 425 which is proportional to the rate of change of the output current and compensates for the above described friction and hysteresis effects so that hunting is substantially eliminated. Another important consequence of this feedback force is the elimination of fluctuations in the position of the recording lever 360 which would be caused by fluctuations of the supply voltage. Additional velocity damping of the beam is provided by the resistor 446 which is connected across the coil 429. However, as noted above, the resistor 446 is preferably formed of copper wire so that it will have no effect on current division in the above described temperature compensation network.

Considering now the electrical operation of the set point portion of the unit 42, it will be recalled that this unit is arranged to provide a D.C. voltage proportional to the deviation between the mechanical setting of the set point lever 373 and the transmitter output current which is calibrated to the common scale 52. The polarity of the output voltage varies depending upon whether the set point indicator is above or below the input current as indicated by the recording indicator 51. The input shaft 379 of the balance unit 371 is positioned in accordance with the setting of the set point lever 373 so that a torque is applied to the beam 450 thereof in proportion to the position of the set point lever. A portion of the transmitter output current flows through the input coil 451 of the balance unit 371 so that a force is exerted on the beam 450 in opposition to the mechanical input due to the set point lever. If the set point indicator 53 is adjusted to the value of the input current, as indicated by the pointer 51, the forces on the beam 450 are balanced.

One end of the beam 450 is positioned adjacent a planar inductance 452 and when the beam is balanced the value of the inductance 452 is such as to tune the oscillator circuit, which includes the left hand section of the double triode tube 453 so that zero output voltage is produced between the output terminals 454 and 455. The oscillator tube acts as one arm of a bridge circuit which includes the resistors 456, 457 and 458 and when the beam 450 is balanced the plate impedance of the oscillator tube is of the correct value to balance this bridge circuit so that zero voltage appears between the output terminals 454 and 455. A feedback current proportional to the output voltage is impressed upon the feedback coil 459 through the series resistor 460. This feedback establishes the relationship between the output voltage and the difference in the torques resulting from the current in the coil 451 and the position of the set point lever 373 and causes the output voltage to be substantially unaffected by changes in line voltage, and changes in the parameters of all components except the balance unit 371 and the precision resistor 460, as well as changes in the load connected across the output terminals 454 and 455. However, it will be understood that when the system is at the control point, i.e., when zero output voltage is produced between the terminals 454 and 455, no feedback current flows through the coil 459 since under these conditions the beam 450 is balanced. In this connection it is noted that the transmitter 105 in the system of Fig. 2 is electrically similar to the set point portion of the unit 42. However, in the transmitter 105 the thermocouple 102 provides a current input signal to the coil 451 and no mechanical set point linkage is required. In the alternative an arrangement such as shown and described in detail in the United States patent to C. G. Roper, No. 2,614,163, issued on October 14, 1952, may be employed for the transmitter 105.

If the position of the set point lever 373 is varied, or the value of the input current changes, the beam is deflected so as to change the value of the inductance 452, thereby changing the tuning of the oscillator tube and the plate impedance thereof so that the bridge circuit becomes unbalanced and an error voltage is produced between the terminals 454 and 455 which is proportional to the deviation of the input current from the mechanical set point and has a polarity which depends on the direction of the deviation. The input current impressed upon the input terminals 420 and 421 is supplied to the input coil 451 through a temperature compensating network which includes the resistor 465, the potentiometer 466 and the resistor 467 which are connected in series across the input coil 451, the input current being applied through the arm of the potentiometer 466. With this arrangement, compensation is obtained for variations in the strength of the calibration spring which connects the shaft 379 to the beam 450 due to temperature in the manner similar to that described above in connection with the compensation network in the recorder portion of the unit 42. If desired, a copper wire damping resistor 461 may be connected across the input coil 451 to reduce the amount of motion resulting from rapidly changing applied torques by means of velocity damping.

In order to permit grounding of one of the output conductors 66, 67 which transmit a direct current signal from the control area to the process area, the conductors 55 and 56 which connect the unit 42 and the controller 43 are not connected to ground for reasons to be described in more detail in connection with the controller 43. Accordingly, the D.C. potential level on the conductors 55 and 56 may vary considerably depending upon the output current level from the controller 43. In the set point portion of the unit 42, the conductor 55 is connected to the cathode of the oscillator tube and the beam 450 is connected to ground through its supporting elements. It has been found that if the grid inductor 452 is connected directly to the cathode of the oscillator tube, the voltage between the beam 450 and the adjacent planar inductance 452 develops an electrostatic force of sufficient magnitude to deflect the beam 450 and thereby produce an erroneous output voltage between the terminals 454 and 455. In order to eliminate this difficulty both sides of the grid inductor 452 are capacitively coupled to the oscillator input circuit and this inductor is connected to ground. Thus, one end of the inductor 452 is coupled through the condenser 470 to the grid of the oscillator tube and the other end of the inductor 452 is coupled through the condenser 471 to the cathode of the oscillator tube, a resistor 472 of relatively high value being connected from the junction point of the inductor 452 and the condenser 471 to ground. With this arrangement both sides of the grid inductor 452 are RF coupled to the oscillator input circuit and this inductor is connected to ground through the resistor 472 so that changes in the D.C. potential of the terminal 455 do not affect the position of the beam 450.

Considering now the manner in which the recorder and set point portions of the unit 42 are calibrated for a standard transmitter input current having a range of from 0.5 to 5.0 milliamperes, a variable current source may be connected between the input terminals 420 and 423 and adjusted so that a current input of 0.5 milliampere is obtained. In the recorder section, the coarse zero adjustment 369 is adjusted so that the recorder pointer 51 is approximately at zero on the scale 52. The pointer is then set exactly to zero by means of the fine zero adjustment 370. The current input is then changed to 5.0 milliamperes D.C. and the recorder pointer 51 is adjusted to full scale range by varying the recorder range potentiometer 441. If the arm of the potentiometer 441 is moved to the right as shown in Fig. 20 a larger input current is applied to the coil 429 so that an increased scale reading is obtained. With an input current of 2.75 milliamperes, the recorder pointer should be positioned at the midpoint of the scale 52 and if the pointer 51 is low the link 363 may be moved into the next one of the holes 359 toward the front of the instrument and the zero and range adjustments repeated until the accuracy of the instrument is within 0.5% of full scale.

In calibrating the set point section of the unit 42, the input current is adjusted to 0.5 milliampere D.C. and the set point indicator 53 is adjusted to zero on the scale 52. The output voltage at the terminals 454 and 455 is measured and the coarse zero adjustment 380 and fine zero adjustment 381 are adjusted to give zero volts output at these terminals. With an input current of 5.0 milliamperes D.C. and the set point indicator 53 adjusted to full scale, the output voltage at the terminals 454 and 455 is then adjusted to zero by varying the range potentiometer 466. The linearity of the set point section may then be checked with an input current of 2.75 milliamperes by adjusting the pointer 53 to give zero volts output at the terminals 454 and 455 and then noting the position of the set point indicator. If the set point indicator 53 is lower than the recorder pointer 51, the length of the link 378 may be shortened and the zero, range and linearity adjustments repeated until the set point indicator is in calibration.

Electronic controller 43

It will be recalled from the general description of the system that the controller 43 receives an error signal from the unit 42 over the conductors 55 and 56 which is proportional to the deviation of the process variable from the position of the set point indicator 53, and the controller 43 develops an output current which is employed to control the manipulation of the process variable by means of the valve positioner unit 45. The typical process control loop in which the system is used has more than one source of time lag with the result that regulation of the process by adjusting the control valve in proportion to the error either fails to produce the desired accuracy of control or results in excessive hunting or even a continuous oscillation at all points in the process. Accordingly, it is the function of the controller 43 to modify the time varying properties of the error signal.

Considered generally, the electronic controller 43 comprises a rate control amplifier 500 and a proportional band and reset rate control amplifier 501 connected in cascade. The manual positioner 44 is also interconnected with the electric controller 43 during manual operation and the electrical circuit diagrams of the electronic controller 43 and the manual positioner 44 are shown in detail in Fig. 23 of the drawings. The error signal is first modified in the rate control amplifier 500 such that the resulting signal is the sum of two components, the first component being an exact reproduction of the unmodified error voltage, and the second component being a voltage approximately proportional to the rate of change of the unmodified error voltage. The resulting error voltage is again modified in the proportional band and reset rate amplifier 501 wherein the output voltage from the rate control amplifier 500 is amplified in accordance with the setting of the proportional band control 61 and in which a third component is added which is proportional to the time integral of the output voltage from the rate control amplifier 500 as determined by the setting of the reset rate control 62. Accordingly, automatic reset action is provided to eliminate the offset resulting from a process load change, as will be readily understood by those skilled in the art.

Referring now to Fig. 23 of the drawings and considering first the rate control amplifier 500, this amplifier comprises two dual triode vacuum tubes 502 and 503, preferably of the commercial type 12AX7, which are connected as a differential amplifier and are arranged to modify the error signal appearing between the conductors 55 and 56 which is transmitted to the electronic controller 43 from the recording and set point unit 42. In order to provide direct coupling through the amplifier 500 so that very slowly changing signals may be amplified and modified, the tubes 502 and 503 are connected between the positive and negative terminals of a selenium rectifier power supply circuit 506 and the error signal appearing between the conductors 55 and 56 is connected to a common terminal 507a the potential of which is substantially midway between the potential of the positive terminal 507 of the power supply 506 and the negative terminal 508 of the power supply 506. A low pass filter circuit including the series resistor 504 and the shunt condenser 505 is employed in the grid circuit of the left hand section of a tube 502 to reduce any 60 cycle voltage components which may appear between the conductors 55 and 56 so that these voltage components are not unduly amplified in the amplifier 500. Furthermore, the maximum gain of the amplifier 500 in the 60 cycle region is limited by means to be described in more detail hereinafter so that the hum signal developed between the conductors 55 and 56 is not increased in amplitude through the amplifier 500.

The cathodes of the two sections of the tube 502 are connected together and through the common cathode resistor 509 to the negative terminal 508 of the power supply 506 and the cathodes of the two sections of the tube 503 are similarly connected through the resistor 522 to the negative terminal 508. The anodes of the two sections of the tube 502 are connected through the resistors 510 and 511 to the opposite ends of a zero potentiometer 512 the arm of which is connected to the positive terminal 507 of the power supply 506. The anode of the right hand section of the tube 503 is connected through the anode resistor 517 to the positive terminal 507. In order to limit the maximum voltage impressed across the left hand section of the tube 503 so that normal commercial ratings are not exceeded, the anode of this tube section is connected to the common terminal 507a. However, since the terminal 507a is several hundred volts positive with respect to the negative terminal 508, it will be evident that the left hand section of the tube 503 has a normal operating potential impressed thereon. The voltage developed at the anode of the left hand section of the tube 502 is coupled to the control grid of the right hand section of the tube 503 through the voltage divider including the resistors 513 and 514 which are connected between the anode of the left hand section of the tube 502 and the negative terminal 508. In a similar manner the voltage developed at the anode of the right hand section of the tube 502 is connected through the voltage divider 515 and 516 to the control grid of the left hand section of the tube 503.

Assuming for the purposes of illustration that the control grid of the right hand section of the tube 502 is connected to the common terminal 507a so that the potential of this control grid does not vary, as the error signal voltage impressed between the conductors 55 and 56 varies, this error voltage is amplified in the left hand section of the tube 502 and the right hand section of the tube 503 so as to appear in amplified form between the terminal 535 and the common terminal 507a. Furthermore, due to the large cathode resistors 509 and 522 and the differential connection of the tube sections, the error voltage will be cathode coupled to the right hand section of the tube 502 and will be amplified therein and the amplified voltage appearing at the anode of the right hand section of the tube 502 is coupled to the left hand section of the tube 503 and is cathode coupled through the common cathode resistor 522 to the right hand section of the tube 503 so as to provide a voltage of like phase between the terminal 535 and the common terminal 507a. It will be evident that a small change in the grid potential of the left hand section of the tube 502 produces a relatively large change in the output voltage. It will also be evident that if the grid voltage of the left hand section of the tube 502 is held fixed and the grid voltage of the right hand section of this tube is varied, a similar amplification is produced due to the differentially connected tube sections in the amplifier 500. Furthermore, if the grid potentials of the right hand and left hand sections of tube 502 vary simultaneously in the same direction, their effects are mutually opposing with the result that the output of amplifier 500 is relatively insensitive to the common level of the grids of the tube 502.

While the description of the operation of the amplifier 500 in the preceding paragraph has been based on the assumption that the grid voltage of the right hand section of the tube 502 is fixed, in the actual circuit a negative feedback voltage is applied to this control grid through a frequency sensitive network so that the output of the amplifier 500 may be modified to provide rate action. More particularly, the anode of the right hand section of the tube 503 is connected through the resistors 518 and 519 to the common terminal 507a and a rate time adjusting potentiometer 520 and condenser 521 are connected in series across the resistor 518, the control grid of the right hand section of the tube 502 being connected to the junction point of the condenser 521 and the arm of the potentiometer 520.

With the above described negative feedback arrangement the output voltage developed between the terminals 535 and 507a is dependent upon the difference between the control grid voltages applied to the two sections of the tube 502 and the output voltage is relatively insensitive to common variations in the level of the grid voltages applied to the two sections of the tube 502. Furthermore, if the full output voltage is fed back to the control grid of the right hand section of the tube 502, the net gain of the amplifier 500 is unity. Accordingly, for a constant or slowly changing error signal the gain of the amplifier 500 is substantially unity and the error signal is merely repeated therethrough without substantial change. When a rapid change in the error signal occurs, the corresponding variation in the output of the amplifier 500 is not fed back instantaneously due to the fact that the condenser 521 cannot be charged instantaneously through the active portion of the potentiometer 520. As a result, the net gain of the amplifier 500 is increased and a component which is approximately proportional to the rate of change of the error signal is developed at the output of the amplifier 500.

The maximum gain of the amplifier 500 is limited by providing a minimum feedback ratio, as determined by the values of the resistors 518 and 519, so that the gain of the amplifier at frequencies outside the process control range, such as the 60 cycle power frequency and transient changes therein, is limited to a maximum value, preferably in the order of ten, and hence the gain is not excessive at these high frequencies so that they are not unduly amplified and do not cause overloading in succeeding stages of the system. In this connection it will be understood that if the condenser 521 were connected directly from the control grid of the right hand section of the tube 502 to the common terminal 507a, the gain at high frequencies would be excessive since at these high frequencies the control grid of the right hand section of the tube 502 would be effectively connected to the common terminal 507a and no degenerative feedback voltage would be applied to this control grid with the result that the gain of the amplifier 500 would be extremely high. However, with the arrangement of the present invention, a minimum feedback voltage appearing across the resistor 519 is always impressed upon the control grid of the right hand section of the tube 502 so as to limit the maximum gain of the amplifier 500. In this connection it will be noted that the network employed to provide the minimum feedback voltage is not frequency sensitive so that the maximum gain of the amplifier 500 is limited for all frequencies.

In order to operate the amplifier 500 from an unregulated power supply and with considerable variations in the alternating current line voltage, it is necessary to provide a reference level which is independent of line voltage variations. Accordingly, the amplifier 500 is stabilized at zero input so that line voltage variations will have no effect upon the output voltage of the amplifier 500. More particularly, the zero level of the amplifier 500 may be adjusted by short circuiting the input conductors 55 and 56 and adjusting the rate response potentiometer 520 to the off position, after which the zero potentiometer 512 is adjusted to produce zero voltage across the resistors 518 and 519. With this arrangement, the zero level of the amplifier 500 is established with reference to the common terminal 507a and this zero level does not vary with changes in line voltage. It will also be noted that with the above described voltage divider arrangement, the voltage dividers 515, 516 and 513, 514 reduce the balanced grid voltages on the tube 503 while maintaining direct coupling between the tubes 502 and 503 so that the anode voltage of the right hand section of the tube 503 can vary above and below the voltage of the common terminal 507a.

Considering now the circuit arrangement of the proportional band and reset rate control amplifier 501, this amplifier comprises three dual triode vacuum tubes 530, 531 and 532. Preferably the tubes 530 and 531 are of the commercial type 12AX7 and the tube 532 is preferably of the commercial type 12AU7. The output voltage from the amplifier 500, which comprises the original error signal plus a component approximately proportional to the rate of change of the error signal, is impressed upon the control grid of the left hand section of the tube 530 over the conductor 535. If rate response action is not required, the error signal may be connected directly to the amplifier 501 by connecting the conductor 55 to the input terminal 536 so that the rate amplifier 500 is not included in the circuit.

The tubes 530, 531 and 532 are connected as a direct coupled differential amplifier which is similar in some respects to the amplifier 500 and develops an output voltage between the terminals 535 and 507a which is proportional to the voltage difference at the control grids of the tube 530 and is relatively insensitive to the common grid voltage level. Thus, the common cathode resistors 533, 534 and 546 are respectively provided for the tubes 530, 531 and 532. The anode resistors 540 and 548 of the tube 530 are connected to the opposite ends of the zero potentiometer 549, the arm of which is connected to the positive terminal 507 of the power supply 506. Likewise, the anodes of the tube 531 are connected through the resistors 548 and 539 to the positive terminal 507. The anode voltages of the two sections of the tube 530 are connected by way of the resistors 541 and 554 to the control grids of the tube 531, these control grids operating at the anode potentials of the tube 530 insofar as D.C. voltages are concerned. Likewise, the anode voltage of the left hand section of the tube 531 is coupled through the voltage divider comprising the resistors 544 and 545 to the control grid of the left hand section of the tube 532 and the anode voltage of the right hand section of the tube 531 is connected through the voltage divider including the resistors 556 and 557 to the right hand section of the tube 532.

Considering now the operation of the amplifier 501, and assuming for purposes of illustration that the right hand control grid of the tube 530 is short circuited to the common terminal 507a, it will be understood from the foregoing description of the amplifier 500 that the error signal impressed upon the control grid of the left hand section of the tube 530 appears in amplified form between the terminals 535 and 507a and, due to the common cathode coupling in each balanced differential amplifier stage, the gain of the amplifier 501 is relatively high although the output thereof is responsive only to the voltage difference at the control grids of the tube 530.

In order to provide proportional band and automatic reset action in the amplifier 501 in the actual circuit, a degenerative feedback voltage is impressed upon the control grid of the right hand section of the tube 530 through a suitable frequency sensitive feedback network. More particularly, the output terminals 537 and 538 of the amplifier 501 are connected in series with the proportional band potentiometer 550 and the resistor 551 to the common terminal 507a. The arm of the potentiometer 550 is connected through the condenser 552 to the arm of the reset rate potentiometer 553 and to the control grid of the right hand section of the tube 530. One end of the potentiometer 553 is connected through the resistor 558 to the common terminal 507a and when the potentiometer 553 is in the off position the condenser 552 is short circuited and the potentiometer 553 is disconnected from the control grid of the right hand section of the tube 530.

Considering first the proportional action of the amplifier 501, and assuming that the potentiometer 553 is connected to the off position so that the condenser 552 is short circuited, the output current which will flow in the load circuit connected to the terminals 537 and 538 will be of such value that the voltage produced between the arm of the potentiometer 550 and the common terminal 507a will substantially equal the applied input signal. Thus, assuming a negative ten-volt error signal is applied to the left hand control grid of the tube 530, an output current will flow through the potentiometer 550 and the resistor 551 which is of sufficient magnitude to produce a voltage between the arm of the potentiometer 550 and the common terminal 507a which is almost equal to the negative ten-volt input signal. In this connection it will be understood that a very slight difference in potential between the control grids of the tube 530 is sufficient to produce a full scale change in current output due to the large amplification in the forward direction within the amplifier 501.

As the arm of the potentiometer 550 is varied, the output current will vary in proportion thereto, the maximum output current being produced when the arm of the potentiometer 550 is next to the junction point of the resistor 551. If the potentiometer 550 is adjusted to provide a maximum output current, the overall amplifier gain is sufficient to produce a full scale current output change, i.e., 4.5 milliamperes for a 1% change in the input error voltage. On the other hand, if the potentiometer 550 is adjusted to the opposite end, the overall amplifier gain is less than unity and a 200% change in the input error signal is required to give a full scale current output change. When the potentiometer 550 is adjusted to provide unity gain through the amplifier, an input error signal of 22.5 volts will produce a 4.5 milliampere output current change. In this connection it will be understood that in computing the gain of the amplifier 501, consideration must be taken of the fact that this amplifier converts a given input voltage into a corresponding output current so that the term gain is not used in its normal sense but rather as the input voltage change required to produce a given output current change, as referred to the standard output current range of 0.5 to 5.0 milliamperes. In the actual circuit the potentiometer 550 and the resistor 551 have a total resistance value of approximately 10,000 ohms so that a full scale current output change corresponds to a voltage change of 45 volts. Considered on this basis, the set point portion of the unit 42 has a gain of one half, since the error output voltage produced by a full scale current input change is 22.5 volts, and the amplifier 501 has a gain which is variable from one to two hundred.

Preferably the circuit constants of the output tube 532 are so chosen that the output current flows from the output terminal 538 through the load circuit to the output terminal 537. When the output current flows in this direction the current drawn from the power supply 506 is substantially reduced. It will also be noted that the impedance of the output current load circuit, which is connected between the terminals 537 and 538, has substantially no effect upon the operation of the amplifier 501 since the feedback voltage is taken between the common terminal 507a and the arm of the potentiometer. Accordingly, the load circuit may vary from one hundred ohms to several thousand ohms without affecting the feedback voltage and the output current is substantially unaffected by the load circuit impedance.

In order to provide automatic reset action, which may be adjusted independently of the above described proportional band action, the condenser 552 and the reset rate potentiometer 553 may be included in the feedback circuit. Assuming that there is no initial charge on the condenser 552 and that a negative ten-volt error signal is suddenly applied to the left hand control grid of tube 530, the voltage across the condenser 552 cannot change suddenly and the output current will change in the manner described in the foregoing paragraphs to produce a proportional component of output current so that the potential on the right hand grid of the tube 530 will also be substantially ten volts negative. In order to produce ten volts across the reset rate potentiometer 553, there must be a corresponding current flowing from the condenser 552 so that the voltage across the condenser 552 increases. However, since the control grids of the tube 530 remain at substantially the same potential, the output current also increases slowly at a rate determined by the setting of the potentiometer 553 so that automatic reset action is provided.

In order to stabilize the amplifier 501 and prevent oscillation thereof at the higher frequencies, there is provided the condensers 542 and 555 which are connected between the control grid and anode of each section of the tube 531. The networks 541, 542 and 554, 555 form low pass filter networks which attenuate the high frequency components of the signal so that oscillation within the amplifier 501 is prevented. In this connection it will be understood that the effective value of the condensers 542 and 555 is increased due to the well known Miller effect within the tube 531 so that a relatively large time constant network may be provided while employing a relatively small condenser. A condenser 559 is connected between the control grids of the tube 532 to further stabilize the amplifier 501 and prevent high frequency oscillations therein.

The amplifier 501 may be calibrated by short circuiting the grid of the left hand section of the tube 530 to the common terminal 507a and adjusting the potentiometer 549 to provide zero output current through the load circuit connected to the terminals 537 and 538, the reset rate potentiometer 553 being in the off position during the initial calibration so that the condenser 552 is short circuited. The zero adjustment may then be refined by turning the potentiometer 553 to maximum reset rate and adjusting the potentiometer 549 so that the output current remains constant at any value in the output range. Under these conditions the amplifier 501 will be balanced such that the error voltage appearing between terminal 535 and the common terminal 507a is very nearly zero when the output current assumes a constant value at some point in the operating range.

*Manual positioner 44*

Considering now the the manual positioning unit 44, it will be recalled from the general description of the system, that this unit includes a regulated source of direct current which may be used for manual control of the process and provision is made for switching from automatic to manual operation and vice versa without substantial change in the output current to the final control elements of the process. More particularly, when the changeover switch 65 is in the automatic position, the relay 560 in the unit 44 is deenergized and the valve positioning current, which is supplied to the unit 44 over the conductors 59 and 60 from the controller 43, is connected through the contact 561 of the relay 560 and through the meter 70 to the output terminals 563 and 564 of the unit 44. Accordingly, during automatic operation the only function of the unit 44 is to indicate on the meter 70 the value of the valve positioning current supplied over the conductors 66 and 67 to the valve positioning unit 45. However (during automatic operation, the contacts 562 of the relay 560 are also closed so that current flows from the power supply circuit 570 through the resistor 571, the contacts 562, a double triode manual control tube 572 and the cathode resistor 573 thereof to the negative terminal of the power supply 570. The anode-cathode space path current of the tube 572 may be controlled by means of a voltage divider network including the resistor 569 and the manual positioning control potentiometer 574 which is connected across the voltage regulator tube 575 so as to provide a source of regulated control voltage for the tube 572.

When the changeover switch 65 is actuated to the manual position, the relay 560 is energized so that the contacts 561 and 562 thereof are opened and the contacts 565 and 566 thereof are closed. When the contacts 565 are closed the conductors 59 and 60 are short circuited so that the controller 43 may function in a normal manner during manual operation although this controller is not connected to the valve positioner unit 45. When the contacts 566 of the relay 560 are closed, a manual positioning current from the power supply 570 is transmitted over the conductors 66 and 67 to the valve positioning unit 45 so as to control manually the position of the valve in accordance with the setting of the potentiometer 574. In order that the process may be changed over from automatic to manual operation without producing an abrupt variation in valve positioning current, the position of the potentiometer 574 is calibrated in terms of the manual control current which is produced during manual operation, this calibration being indicated on the scale 72 (Fig. 1). Accordingly, when it is desired to change from automatic to manual operation the position of the manual control knob 71 on the shaft of the potentiometer 574 is adjusted to the current value indicated by the meter 70 before the changeover switch 65 is switched to manual operation so that the currents supplied to the valve positioning unit 45 immediately before and after changeover are substantially the same. In this connection it will be noted that the cathode resistor 573 of the tube 572 provides a certain amount of self regulation and the control grid potential of the tube 572 is derived from the voltage regulator tube 575 so that the manual control current is substantially independent of line voltage variations, although the current drain on the regulator tube 575 is relatively small.

In order that the process may be changed back from manual to automatic control without producing an abrupt variation in the process and without requiring tedious manual adjustments, the amplifier 501 in the electronic controller 43 is continuously controlled during manual operation so as to conform to changes made during this interval. More particularly, the controller 43 is provided with a relay 580 which is energized when the changeover switch 65 in the unit 44 is actuated to the manual position, this relay being controlled from the manual positioning unit 44 over the conductors 57 and 58. Accordingly, during manual operation the contacts 581 of the relay 580 are closed so that one side of the resistor 571 in the unit 44 is connected over the conductor 75, through the resistor 577, and through the contacts 581 to the control grid of the right hand section of the tube 530 and the amplifier 501. The other side of the resistor 571 is connected over the conductor 60 and through the potentiometer 550 and the resistor 551 to the common terminal 507a. The value of the resistor 571 is chosen to be equal to the total series resistance of the potentiometer 550 and the resistor 551, and, during manual operation, the manual control current which is supplied to the valve positioning unit 45 flows through the resistor 571 so as to produce a voltage thereacross such that the potential on the conductor 75 is negative with respect to the conductor 60. On the other hand, during manual operation the controller output current, which flows through the contacts 565 of the relay 560, produces a voltage drop across the potentiometer 550 and the resistor 551. The voltages across the resistor 571 and the potentiometer 550 are connected in series opposition between the control grid of the right hand section of the tube 530 and the common terminal 507a. Accordingly, the net voltage applied to the control grid of the right hand section of the tube 530 is the difference between the two voltage drops just described and the amplifier 501 functions to adjust the output current thereof so that the differential input voltage applied to the control grids of the tube 530 is substantially equal to zero. As the manual control current is varied by adjustment of the potentiometer 574 the controller output current which flows through the potentiometer 550 and the resistor 551 is continuously and automatically adjusted to match the manual control current during manual operation so that the amplifier 501 is held in readiness for automatic operation. If, at the moment, the changeover is made, the error voltage appearing between the grid of the left hand section of tube 530 and the common terminal 507a is zero, the current flowing in the output of the amplifier 501 will exactly equal the manual control current, and, since the voltage across the capacitor 552 cannot change rapidly after the changeover is made, there will be no change in the current to the valve positioning unit 45. If, on the other hand, an error voltage does exist before changeover, the above described current values will not be equal and the current in the output of the amplifier 501 will be different from the manual control current by an amount necessary to produce the required voltage drop across the potentiometer 550 and the resistor 551. Since a 100% change in the recorder pen 51 corresponds to a 22½ volt error signal while a 100% change in output current from the amplifier 501 corresponds to a 45 volt change across the potentiometer 550 and the resistor 551, the "bump" in output current is only one half the error existing at the moment changeover is made. Furthermore, in accordance with an important feature of the present invention, the above relationship holds regardless of the setting of the proportional band control 550. Accordingly, with the above described arrangement the proportional band potentiometer 550 may be adjusted to give very sensitive control, i.e., a 1% proportional band, and the change may be very quickly made from manual to automatic operation without producing a large variation in valve positioning current even though a slight deviation from the set point may exist so that "bumping" the process is avoided.

In order to suppress voltage transients which would arise during the make interval of the relay contacts on the relay 560 when this relay is thrown from automatic to manual operation, the condenser 578 is connected between the conductors 59 and 60 and the condenser 579 is connected from the conductor 60 to the anodes of the tube 572. Accordingly, during the open circuit intervals of the relay switch contacts, the condensers 578 and 579 function to prevent abrupt voltage transients from being impressed upon the control grid of the right hand section of the tube 530 so that the output of the amplifier 501 is not varied abruptly during the changeover interval. Also, the resistor 577 is chosen to have a value which is several times larger than either of the source impedances 571 or 550 so that the condenser 552 must be charged through the relatively large resistor 577 and abrupt voltage variations cannot be produced across this condenser. In this connection it will be understood that if the resistor 577 is too large, the controller 43 will not track manual control variations properly since a time lag will be produced between the adjustment of the potentiometer 574 and the response of the controller 43 thereto. However, it is pointed out that the speed of response to manual variation when the potentiometer 550 is adjusted for a large proportional band such as 200%, is more rapid than the actual time constant of the condenser 552 and the resistor 577 since the feedback action within the amplifier 501 tends to decrease the time required to charge the condenser 552 due to the fact that the voltage at the arm of the potentiometer 550 is also increasing as the manual control current is increased. If the value of the condenser 552 is changed to provide a different range of automatic reset action, the resistor 577 is also changed so that the time constant of the resistor 577 and the condenser 552 remains the same.

It will be noted that the output conductor to which the resistor 571 is connected is not switched for automatic to manual changeover so that when the power supply 570 is connected in the circuit for manual operation the D.C. potential applied to the input of the amplifier 501 does not change abruptly. With this arrangement, stray capacity to chassis the amplifier 501 can be tolerated without producing objectionable variations in the output of this amplifier when changing from automatic to manual operation. It will also be noted that the above described arrangement in which the relay 580 is located in the controller 43 permits the control conductor 75 to be open circuited within the unit 43 so that stray pickup voltages on the conductor 75 are not continuously impressed upon the high impedance input circuit of the amplifier 501 during automatic operation.

In some applications, one side of the output current circuit to the valve positioner 45 is connected to ground so that a grounded, low impedance output circuit is provided for the transmission of signals from the control area to the process area. For example, the output terminal 564 may be connected to ground so that the conductor 67 is at ground potential. Since the output current from the controller 43 flows through the potentiometer 550 and the resistor 551, it will be evident that when one end of the potentiometer 550 is connected to ground by grounding the output terminal 564, the potential of the common terminal 507a will vary in accordance with changes in the output current. While such connection does not interfere with the operation of the amplifiers 500 and 501 in the controller 43, it does require the above described circuit arrangement in the set point portion of the unit 42 so that variations in the potential of the conductor 56 do not change the error voltage between the conductors 55 and 56. Accordingly, the output circuit to the valve positioner 45 may be grounded without interfering with the operation of the controller 43 and the ground wire may be used as common to simplify wiring in large installations.

In the above described controller 43, adjustment of the proportional band control 61 causes a change in the controller output current, and hence valve position, since for a given error voltage the output current of the controller automatically assumes a value such that the potentials on the control grids of the tube 530 are substantially equal. Accordingly, if it is desired to change the proportional band setting, the switch 65 is first thrown to the manual position, the potentiometer 550 is adjusted to the desired setting and the switch 65 is thrown back to the automatic position without producing any change in valve position.

In the event that it is desired to provide a system in which the proportional band control does not change the controller output current when it is adjusted, the controller 43 may be provided with a fixed gain of 100, for example, and the gain within the set point portion of the unit 42 may be made variable from $\frac{1}{200}$ to 1 so that the overall gain of the system varies from $\frac{1}{2}$ to 100, i.e., proportional band action of from 200% to 1%. In this modified arrangement the potentiometer 550 in the amplifier 501 is replaced by a fixed resistor of the same value and the condenser 552 is connected to the junction point of this fixed resistor and the resistor 551. In the set point portion of the unit 42 the resistor 460 is replaced by a proportional band potentiometer having a resistance which can be varied from a value somewhat larger than the resistor 460, so that the gain of the set point portion of the unit 42 may be increased to unity, to a value many times smaller than the resistor 460, so that the gain may be reduced to $\frac{1}{200}$. When the gain in the controller 43 is held fixed a a relatively high value in the manner described above, the controller 43 is preferably energized from a well regulated alternating current source so that both filament voltage and plate voltage remain substantially constant despite fluctuations in the power line and the relatively small error input signal which is supplied to the controller 43 in this modification may be suitably amplified without introducing additional errors in the control system. In this modification the proportional band potentiometer may be varied in the set point portion of the unit 42 without changing the output current to the valve when the error voltage between the terminals 454 and 455 is zero since under this condition, the current through the control 460 is zero. Furthermore, in the modified system the changeover arrangement functions in a manner identical to that described in detail above continuously to adjust the controller output current during manual operation so that valve travel is automatically held to a minimum on changing from manual to automatic operation.

For completeness of illustration only, and not in any sense by way of limitation, the following circuit constants are given as being typical for an electronic controller and manual positioner of the type represented in Fig. 23. In this particular circuit the tubes 502, 503, 530 and 531 were double triodes type 12AX7, the tube 532 was a double triode 12AU7 and the tube 572 was a 12AT7. In the amplifier 500 the condenser 521 had a value of 4.0 mfd. for a rate time of from 0.1 to 10 minutes and a value of 0.4 mfd. for a rate time of from 0.01 to 1.0 minute, the potentiometer 521 having a total resistance of 150 megohms divided into equal percentage increments. Also, in the amplifier 501, the condenser 552 had a value of 4.0 mfd. for a reset rate in repeats per minute of from 0.1 to 10, the potentiometer 553 had a total resistance of 150 megohms divided into equal percentage increments, and the resistor 577 had a value of 100,000 ohms. For a reset range of from 1 to 100 repeats per minute the condenser 552 had a value of 0.4 mfd. and the resistor 577 had a value of 1 megohm. Other circuit constants follow:

| | | |
|---|---|---|
| Condenser 505 | mmf | 5,100 |
| Condenser 542 | mmf | 5,100 |
| Condenser 555 | mmf | 5,100 |
| Condenser 559 | mmf | 1,000 |
| Condenser 578 | mfd | 0.1 |
| Condenser 579 | mfd | 0.1 |
| Resistor 504 | megohms | 8.2 |
| Resistor 509 | do | 1.5 |
| Resistor 510 | do | 1.5 |
| Resistor 511 | do | 1.5 |
| Resistor 513 | do | 8.2 |
| Resistor 514 | do | 3.3 |
| Resistor 515 | do | 8.2 |
| Resistor 516 | do | 3.3 |
| Resistor 517 | ohms | 560,000 |
| Resistor 518 | megohms | 1.8 |
| Resistor 519 | ohms | 180,000 |
| Resistor 522 | do | 180,000 |
| Resistor 533 | megohms | 1.5 |
| Resistor 534 | ohms | 510,000 |
| Resistor 539 | do | 100,000 |
| Resistor 540 | megohms | 1.8 |
| Resistor 541 | do | 8.2 |
| Resistor 543 | ohms | 100,000 |
| Resistor 544 | megohms | 1.0 |
| Resistor 545 | ohms | 330,000 |
| Resistor 546 | do | 15,000 |
| Resistor 547 | do | 330,000 |
| Resistor 548 | megohms | 1.8 |
| Resistor 551 | ohms | 51 |
| Resistor 554 | megohms | 8.2 |
| Resistor 556 | do | 1.0 |
| Resistor 557 | ohms | 330,000 |
| Resistor 558 | megohms | 1.5 |
| Resistor 571 | ohms | 10,000 |
| Resistor 573 | do | 5,000 |
| Resistor 576 | do | 120,000 |
| Potentiometer 512 | do | 500,000 |
| Potentiometer 549 | megohms | 1.0 |
| Potentiometer 550 | ohms | 10,000 |
| Potentiometer 574 | do | 50,000 |

*Electro-pneumatic valve positioning unit 45*

Considering now in more detail the valve positioning unit 45, it will be recalled from the general description of the system that this unit provides precision valve positioning of a standard, pneumatically operated control valve from a direct current input signal of from 0.5 to 5.0 milliamperes, this input signal being supplied during automatic operation from the controller 43 by way of the manual positioning unit 44 over the conductors 66 and 67. In the system of the present invention, the pneumatically controlled valve may be substantially instantaneously positioned by the direct current input signal so that all lag problems normally encountered with pneumatic transmission are eliminated and the distance limitations normally inherent in pneumatic control systems are obviated. Substantially instantaneous response may be made over distances up to 30 miles or more and the input signal is unaffected by induced alternating currents or changing line resistances up to a maximum of approximately 3,000 ohms.

The details of the unit 45 and the associated control valve 46 are shown in more detail in Figs. 25 to 31, inclusive, of the drawings. Referring to these figures, the valve positioning unit 45 comprises an electromechanical balance unit indicated generally at 600 (Fig. 26) which is positioned within an explosion proof housing 601 which is mounted on the valve bracket 602. An air relay 603, which is mounted adjacent the housing 601, is employed to provide the diaphragm air pressure necessary to actuate the valve 46, the supply air pressure to the relay 603 being indicated by the gauge 604 and the diaphragm air pressure of the relay 603 being indicated by the gauge 605. The diaphragm air output of the relay 603 is connected through the line 606 to the diaphragm chamber 607 of the pneumatically controlled valve 46, it being understood that the position of the valve 46 is controlled in accordance with the air pressure within the chamber 607 by means of the conventional spring loaded diaphragm 608.

The balance unit 600 comprises a resiliently mounted beam 610 which is deflected in proportion to the current input signal applied to the terminals 611 and 612 by means of the input coil 613 which is carried on one end of the beam 610 and is positioned within the air gap of the permanent magnet structure 614. By means to be described in more detail hereinafter, the beam 610 controls the diaphragm air pressure output of the air relay 603 by offering a variable obstruction to air issuing from a pilot air nozzle 615 which is positioned within the housing 601 and is connected to the air relay 603 through the tubing 616. The beam 610 is also connected through a mechanical feedback linkage to the valve stem 620 of the control valve 46 so that the beam 610 is positioned by the opposed forces produced by the current input signal and the loading effect produced by the linkage which is connected to the valve stem 620.

Preferably, the air relay 603 is of a double diaphragm design so as to amplify the pressure change. The supply air is admitted to the relay 603 from the supply line 63 through the inlet 622 and maintains supply air pressure within the chamber 623 of the relay 603. This supply air also passes through the orifice 624 and is dropped in pressure before entering the large diaphragm chamber 625 and issuing from the pilot air nozzle 615. Preferably the orifice 624 is made of sapphire to provide maximum life and a spring loaded wire end plunger 626 is provided to clean the orifice 624 in the event of clogging. It will also be noted that only low pressure air issuing from the nozzle 615 is present within the explosion proof housing 601, the air relay 603 being mounted on the side of the housing 601. Also, the only communication to the air relay 603 is through the small tubing 616 so that the flame path to the exterior is relatively long and is of small diameter to prevent an explosion within the casing from igniting the surrounding area.

When the current input increases, the beam 610 causes an increased obstruction to air issuing from the nozzle 615 and the increased air pressure on the large relay diaphragm 627 opens the inlet seat 628 so that the supply air is admitted to the small diaphragm chamber 629 of the relay 603 and is transmitted through the line 606 to the valve diaphragm chamber 607 so as to move the valve stem 620 downwardly. This motion of the valve stem 620 is transmitted through the feedback linkage to the beam 610 and increases the mechanical force on the beam until a balance is produced at the new valve stem position which is proportional to the increased current input.

When the current input decreases the beam causes a reduced obstruction to air issuing from nozzle 615 so that the air pressure on the large relay diaphragm 627 is reduced until the poppet spring 630 raises the small diaphragm 631 and allows air within the chamber 629 to escape through the exhaust seat 632 and out the exhaust port 633. The reduced air pressure above the valve diaphragm 608 results in motion of the valve stem 620 upwardly, thereby reducing the mechanical force on the beam 610 until a balance is achieved at the new valve stem position, at which point the air pressure within the large diaphragm chamber 625 is sufficient to force the diaphragm 627 down and close the exhaust seat 632 so as to prevent further escape of air from the port 633 thereby maintaining the new valve stem position.

In order to compensate for changes in the mechanical loading on the beam 610 due to temperature effects, the current input signal is applied to the coil 613 through a compensating network including the potentiometer 635, the shunt resistor 634 and the series resistor 636. The resistors 634 and 636 and the potentiometer 635 all have a low temperature coefficient so that the increase in the resistance of the coil 613 compensates for the reduced mechanical loading on the beam 610 at high temperatures, as described in more detail above in connection with the recorder portion of the unit 42. Also, the shaft 637 of the potentiometer 635 may be adjusted so that the span of the positioning unit 45 is calibrated to the standard current input range of 0.5 to 5.0 milliamperes.

Considering now the mechanical linkage which is employed to load the beam 610 mechanically in accordance with the position of the valve stem 620, the valve stem 620 is connected through the turnbuckle 640 to the end of a lever 641 which is connected externally of the casing 601 to the end of a shaft 642 (Fig. 27) which is journaled in the bearing 643, an adjusting lever 644 being connected to the other end of the shaft 642 inside the casing 601 so that the lever 641, the shaft 642 and the lever 644 act as a bellcrank lever to convert vertical motion of the valve stem 620 into rotary motion of the adjusting lever 644. A coil spring 645 is employed to spring load this bellcrank lever so that it follows the valve stem travel without lost motion. The lever 644 is provided with a longitudinally extending slot 646 and an adjusting plate 647 is provided with a downwardly extending connecting pin 648 which projects through the slot 646 and engages the adjacent edge 649 of a follower lever 650. The follower lever 650 is pivotally mounted on a post 651 which is secured to a segment plate 652. The segment plate 652 is mounted on a clamping plate 653 which is secured to the end of the shaft 654 by means of the lock screw 655 and the segment plate 652 may be rotated relative to the shaft 654 by means of the adjusting screw 656 so as to provide a zero adjustment of the mechanical feedback linkage. The shaft 654 is journaled in a bearing 657 which is supported on a vertically extending flange portion 663 of a bracket 638 on which the balance unit 600 is mounted, and a lever 658 is connected to the inner end of the shaft 654 inside the cover 639 of the balance unit 600. A takeup spring 660 is connected between the end of the lever 658 and an ear portion 661 provided on a bracket 662 which is mounted on the flange 663, so that the follower lever 650 is held in engagement with the connecting pin 648. Also, a calibration spring 665 is connected from an intermediate point on the lever 658 to the resiliently mounted beam 610 so as to apply a force thereto in opposition to the electromagnetic deflection of the beam 610 produced by the coil 613. In this connection it will be understood that the beam 610 is resiliently supported by means of the thin resilient elements 667, and the other elements of the mounting structure for the beam 610 are substantially identical to those described in detail above in connection with the transmitter unit 41, although it will be understood that the balance unit 600 is mounted in the casing 601 with the position of the beam 610 reversed from that of the beam 210 in the balance unit 200.

In order to provide for valves of different strokes, the adjusting lever 644 carries a calibrated stroke scale 670 which is positioned adjacent the slot 646 so that the adjusting plate 647 may be clamped in the correct position to provide for uniform movement of the follower lever 650 when the valve is stroked from the fully open to the fully closed position. Thus, if a valve having a one quarter inch stroke is to be controlled, the adjusting plate 647 is positioned opposite the ¼ inch mark on the scale 670 so that a relatively small vertical movement of the end of the lever 641 produces a predetermined pivotal movement of the follower lever 650. On the other hand, if a valve having a three inch stroke is to be controlled, the plate 647 is positioned adjacent the 3 inch mark on the scale 670 so that a relatively large vertical movement of the lever 641 is required to produce the same arcuate movement of the follower lever 650.

In order to prevent the balance unit 600 from being damaged in the event that the valve stroke adjustment is incorrectly made, a spring loaded override mechanism is provided so that overtravel of the valve stem does not exert excessive force on the shaft 654 or the lever 658 connected thereto. More particularly, the follower lever 650 is provided with a down turned lip portion 672 which is spring biased into engagement with the edge 673 of the segment plate 652 by means of the coil spring 674 which is positioned about the post 651, one end of the spring 674 being secured within a slot 675 in the head portion of the post 671 and the other end 676 of the spring 674 being biased against an upturned lug portion 677 on the follower lever 650. The coil spring 674 normally urges the lug portion 672 into engagement with the edge 673 of the segment plate 652 so that these members act as a single integral unit and when the follower lever 650 is moved by the connecting pin 648 a corresponding rotation of the shaft 654 is produced. However, if the adjustment lever 644 is moved beyond the normal full scale range of the instrument, for example, to the position indicated in dotted lines at 680 in Fig. 28, the biasing force of the coil spring 674 is overcome and the follower lever 650 pivots about the post 651 to the new position indicated in dotted lines at 681 in Fig. 28 without producing rotation of the shaft 654. Accordingly, the valve stroke adjustment can be incorrect without producing excessive torque on the input shaft 654 or damage to the resiliently mounted beam 610. In this connection it will be understood that in the normal full range position of the instrument, as shown in full lines in Fig. 30, the corner 685 of the lever 658 engages the vertical flange 663 so as to prevent further movement of the lever 658. Also, the bracket 662 is provided with the ear portion 686 which functions as a lower stop and prevents overtravel of the lever 658 in the opposite direction.

Considering now the manner in which the beam 610 is arranged to provide a variable obstruction to the air issuing from the nozzle 615, it will be recalled that the components of the electromechanical balance 600 are enclosed within the cover 639 which is secured to the vertical flange 663 so as to provide a dust-proof housing for these components. A transversely extending arm 690 is secured to an upstanding bracket 691 which is mounted on the beam 610 at the pivotal axis thereof, the arm 690 terminating in a rod 692 which extends through a clearance hole 693 in the vertical flange 663. A control member 694 is positioned on the end of the rod 692 and is provided with a planar control element portion 695 which is positioned adjacent the nozzle 615 and in a plane parallel to the plane of the beam 610 and substantially perpendicular to the resilient mounting elements 667. Since the arm 690 is mounted on the pivotal axis of the beam 610, deflection of the beam 610 produces rotation of the rod 692 so that the control element 695 is moved with respect to the nozzle 615 and provides a variable obstruction thereto. A stop screw 710 is supported on a split stud 711 mounted on the flange 663 and may be adjusted so as to provide a limit stop for the control element 695.

In order that the pilot nozzle 615 may be readily removed independently of the balance unit 600 so that this nozzle can be cleaned without disassembling the balance unit, there is provided a mounting block 696 secured to the flange 663 and provided with an opening 697 therethrough which is adapted to receive the body portion 698 of the pilot nozzle and is threaded at 699 to receive the threaded end portion of the nozzle 615. A transverse slot 700 is provided in the block 696 so as to lock the nozzle in adjusted position. The nozzle body 698 is provided with O-rings 701 which seal the passageway 697 on either side of a transverse passageway 702 in the block 696 and the body portion 698 is provided with a central passageway 703 which communicates with the annular space 704 between the O-rings 701. The pilot air line 616 is connected to the collar 705 which is secured beneath the lead washer 707 positioned under the head of the plug 708. The plug 708 has a threaded shank 706 and provides an annular passageway 709 which communicates with the passageway 702 through the central bore of the plug 708 so that air passes through the plug 708, the passageway 702, the annular space 704 and the passageway 703 and issues from the nozzle head. It will be observed that the nozzle body 698 may be readily removed without interfering in any way with the operation of the balance unit 600 and without interfering with the connection of the pilot air line 616. It will also be noted that the pilot air nozzle 615 is not located within the balance unit proper so that the air inside the balance is not contaminated and is free from dust and dirt which may be carried by the pilot air. The low pressure air issuing from the nozzle 615 may be discharged from the casing 601 by means of the breather bushing 715.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an automatic process control system of the type having a primary measuring element for producing a current proportional to a measured variable of the process and means for developing an electrical error signal proportional to the deviation of said current from a predetermined set point, automatic controller means for continuously controlling the process in the direction to reduce said error signal and including an amplifier having a pair of input circuits and an output circuit, means for impressing said error signal on one of said input circuits, means for feeding back an electrical signal from said output circuit to the other of said input circuits, an electrical signal responsive output control circuit, means normally connecting said output circuit to said signal responsive control circuit, manually operable control means including an adjustable control member for developing a second control current, switch means for connecting said manually operable control means to said signal responsive control circuit in place of said output circuit, and means for calibrating the position of said control member in terms of the corresponding values of said second control current, whereby said control member may be adjusted to provide substantially bumpless changeover from automatic to manual operation.

2. In an automatic process control system of the type having a primary measuring element for producing a current proportional to a measured variable of the process and means for developing an electrical error signal proportional to the deviation of said current from a predetermined set point, current automatic controller means for continuously controlling the process in the direction to reduce said error signal and including an amplifier having a pair of input circuits and an output circuit, means for impressing said error signal on one of said input circuits, means for feeding back an electrical signal from said output circuit to the other of said input circuits, an electrical signal responsive output control circuit, means normally connecting said output circuit to said signal responsive control circuit, manually operable control means including an adjustable control member for developing a second control current, switch means for connecting said manually operable control means to said signal responsive control circuit in place of said output circuit, means for producing a second feedback signal proportional to said second control current, and means for impressing said second feedback signal on said other input circuit when said manually operable control means is connected to said signal responsive control circuit, thereby continuously to supply a control signal to said automatic controller means during manual operation and minimize variations in the process when changing from manual to automatic operation.

3. In an automatic process control system of the type having a primary measuring element for producing a current proportional to a measured variable of the process and means for developing an electrical error signal proportional to the deviation of said current from a predetermined set point, automatic controller means for continuously controlling the process in the direction to reduce said error signal and including an amplifier having a pair of input circuits and an output circuit, means for impressing said error signal on one of said input circuits, means for feeding back an electrical signal from said output circuit to the other of said input circuits, an electrical signal responsive output control circuit, means normally connecting said output circuit to said signal responsive control circuit, means for varying said feedback signal to produce changes in the proportional response of said automatic controller means to said error signal, manually operable control means including an adjustable control member for developing a second control current, switch means for connecting said manually operable control means to said signal responsive control circuit in place of said output circuit, means for producing a second feedback signal proportional to said second control current, and means for impressing said second feedback signal on said other input circuit when said manually operable control means is connected to said signal responsive control circuit, whereby the process is changed by an amount not greater than one half the deviation of said measuring element current from said set point when changing from manual to automatic operation and independently of said feed back voltage varying means.

4. In an automatic process control system of the type having a primary measuring element for producing a current proportional to a measured variable of the process and means for developing an electrical error signal proportional to the deviation of said current from a predetermined set point, automatic controller means for continuously controlling the process in the direction to reduce said error signal and including an amplifier having a pair of input circuits and an output circuit, said output circuit including a first impedance, means for impressing said error signal on one of said input circuits, an electrical signal responsive output control circuit, means normally connecting said output circuit to said current responsive control circuit with said first impedance in series therewith, means for feeding back a variable portion of the voltage developed across said first impedance to the other of said input circuits, thereby to control the process in proportion to said error signal, a manually adjustable current source including a second impedance, switch means for connecting said current source to said current responsive control circuit in place of said output circuit and with said second impedance in series therewith, said first and second impedances being substantially equal, and means for impressing a voltage proportional to the difference in voltage developed across said first and second impedances on said other input circuit when said current source is connected to said signal responsive control circuit.

5. In an automatic process control system of the type having a primary measuring element for producing a current proportional to a measured variable of the process and means for developing an electrical error signal proportional to the deviation of said current from a predetermined set point, automatic controller means for continuously controlling the process in the direction to reduce said error signal and, including an amplifier having a pair of input circuits and an output circuit, said output circuit including a first impedance, means for impressing said error signal on one of said input circuits, an electrical signal responsive output control circuit, means normally connecting said output circuit to said current responsive control circuit with said first impedance in series therewith, means including a resistance-capacitance network for feeding back a variable portion of the voltage developed across said first impedance to the other of said input circuits, thereby to vary the output of said controller in proportion to said error signal and to provide automatic reset action in accordance with the time constant of said network, a manually adjustable current source including a second impedance, switch means for connectings said current source to said current responsive control circuit in place of said output circuit and with said second impedance in series therewith, said first and second impedances being substantially equal, and means for impressing the voltages developed across said first and second impedances on said other input circuit in series opposition when said current source is connected to said current responsive control circuit.

6. In an automatic process control system of the type having a primary measuring element for producing a current proportional to a measured variable of the process and means for developing an electrical error signal proportional to the deviation of said current from a predetermined set point, automatic controller means for continuously controlling the process in the direction to reduce said error signal and including an amplifier having a pair of input circuits and an output circuit, means for impressing said error signal on one of said input circuits, an electrical signal responsive output control circuit means connecting said output circuit to said signal responsive control circuit, a differentiation network, and means including said network for feeding back a voltage from said output circuit to the other of said input circuits, thereby automatically to provide a proportional reset mode of control of the process.

7. In an automatic process control system of the type having a primary measuring element for producing a current proportional to a measured variable of the process and means for developing an electrical error signal proportional to the deviation of said current from a predetermined set point, an amplifier having automatic controller means for continuously controlling the process in the direction to reduce said error signal and including a pair of input circuits and an output circuit including a potentiometer, means for impressing said error signal on the one of said input circuits, a current responsive output control circuit, means connecting said output circuit to said current responsive control circuit with said potentiometer in series therewith, means including a series capacitor and shunt resistor network for connecting the arm of said potentiometer to said other input circuit, thereby to provide a proportional-reset mode of control of the process, and means for varying the value of said resistor thereby to vary the reset rate of said proportional-reset mode of control.

8. In an automatic process control system of the type having a primary measuring element for producing a current proportional to a measured variable of the process and means for developing an electrical error signal proportional to the deviation of said current from a predetermined set point, automatic controller means for continuously controlling the process in the direction to reduce said error signal and including an amplifier having a pair of input circuits and an output circuit, means for impressing said error signal on one of said input circuits, a current responsive output control circuit means effectively connecting said output circiut to said current responsive control circuit, and means including an integration network connected between said output circuit and the other of said input circuits for feeding back a voltage proportional to the output circuit voltage, whereby said output circuit voltage includes a component proportional to the rate of change of said error signal.

9. In an automatic process control system of the type having a primary measuring element for producing a current proportional to a measured variable of the process and means for developing an electrical error signal proportional to the deviation of said current from a predetermined set point, an amplifier having a pair of input circuits and an output circuit, means for impressing said error signal on one of said input circuits, a current responsive output control circuit means effectively connecting said output circuit to said current responsive control circuit, means including an integration network connected between said output circuit and the other of said input circuits for feeding back a voltage proportional to the output circuit voltage, whereby said output circuit voltage includes a component proportional to the rate of change of said error signal, and means for limiting the maximum gain of said amplifier.

10. In an automatic process control system, transmitter means for developing a first electrical signal proportional to a measured variable of the process which signal is suitable for transmission from the process area to a control station, set point means at the control station and responsive to said first electrical signal for developing an electrical error signal proportional to the deviation of said first electrical signal from a predetermined set point, automatic controller means at the control station and responsive to said error signal for developing a second electrical signal proportional to said error signal which is suitable for transmission from the control station to the process area, manually operable controller means at the control station for developing a third electrical signal which is suitable for transmission from the control station to the process area, electrical signal responsive positioning means in the process area for controlling a final control element of the process in the direction to reduce said error signal, means for selectively supplying said second and third electrical signals to said positioning means for automatic or manual control of the process, and means for supplying a control signal to said automatic controller means during periods of manual operation which is proportional to said third electrical signal so that changes from manual to automatic operation do not produce large amplitude variations in said second electrical signal.

11. In an automatic process control system, transmitter means for developing a first electrical signal proportional to a measured variable of the process which signal is suitable for transmission from the process area to a control station, set point means at the control station and responsive to said first electrical signal for developing an electrical error signal proportional to the deviation of said first electrical signal from a predetermined set point, automatic controller means at the control station and responsive to said error signal for developing a second electrical signal proportional to said error signal which is suitable for transmission from the control station to the process area, manually operable controller means at the control station for developing a third electrical signal which is suitable for transmission from the control station to the process area, electrical signal responsive positioning means in the process area for controlling a final control element of the process in the direction to reduce said error signal, means for selectively supplying said second and third electrical signals to said positioning means for automatic or manual control of the process, and means for adjusting said automatic controller means during periods of manual operation so that the value of said second electrical signal is continuously varied in accordance with variations in said third electrical signal.

12. In an automatic process control system, transmitter means for developing a first electrical signal proportional to a measured variable of the process which signal is suitable for transmission from the process area to a control station, set point means at the control station and responsive to said first electrical signal for developing an electrical error signal proportional to the deviation of said first electrical signal from a predetermined set point, automatic controller means of the proportional mode type at the control station and responsive to said error signal for developing a second electrical signal proportional to said error signal which is suitable for transmission from the control station to the process area, said controller means including means for adjusting the proportional band thereof, manually operable controller means at the control station for developing a third electrical signal which is suitable for transmission from the control station to the process area, electrical signal responsive positioning means in the process area for controlling a final control element of the process in the direction to reduce said error signal, means for selectively supplying said second and third electrical signals to said positioning means for automatic or manual control of the process, and means for adjusting said automatic controller means during periods of manual operation and independently of said proportional band adjusting means so that the value of said second electrical signal is continuously varied in accordance with variations in said third electrical signal.

13. In an automatic process control system, transmitter means for developing a first electrical signal proportional to a measured variable of the process which signal is suitable for transmission from the process area to a control station, set point means at the control station and responsive to said first electrical signal for developing an electrical error signal proportional to the deviation of said first electrical signal from a predetermined set point, automatic controller means at the control station and responsive to said error signal for developing a second electrical signal proportional to said error signal which is suitable for transmission from the control station to the process area, manually operable controller means at the control station for developing a third electrical signal which is suitable for transmission from the control station to the process area, electrical signal responsive positioning means in the process area for controlling a final control element of the process in the direction to reduce said error signal, means for selectively supplying said second and third electrical signals to said positioning means for automatic or manual control of the process, and means for preventing variation in said second electrical signal by an amount greater than one-half the deviation of said first electrical signal from said set point when changing from manual to automatic operation.

14. In an automatic process control system, transmitter means for developing a variable direct current signal which is substantially free from fluctuations in the frequency range of useful control signals of the system and is proportional to a measured variable of the process, a first two wire direct current transmission circuit connected to said transmitter means and extending from the process area to a control station, set point means at the control station and responsive to said first electrical signal for developing an electrical error signal proportional to the deviation of said first electrical signal from a predetermined set point, automatic controller means at the control station and responsive to said error signal for developing a direct current positioning signal which is substantially free from fluctuations in the frequency range of useful control signals of the system, means included in said automatic controller means for modifying said error signal to provide proportional band and automatic reset components in said direct current positioning signal, direct current responsive positioning means in the process area for controlling a final control element of the process, a second two wire direct current transmission circuit extending from the control station to the process area and connected to said positioning means, and means for supplying said direct current positioning signal to said second transmission circuit at the control station.

15. In an automatic process control system of the type having a primary measuring element for producing a current proportional to a measured variable of the process and means for developing an electrical error signal proportional to the deviation of said current from a predetermined set point, automatic controller means including amplifier means provided with input means and an output circuit, means for connecting said error signal to a first point in said amplifier input means, means for feeding back an electrical signal from said output circuit to a second point in said amplifier input means, an electrical signal responsive output control circuit, means normally connecting said amplifier output circuit to said signal responsive control circuit so as to supply a first control signal thereto, manually operable control means for developing a second control signal, and switch means for connecting said manually operable control means to said signal responsive control circuit in place of said amplifier output circuit and supplying a feedback signal to said second point in said amplifier input means which is proportional to said second control signal.

16. In an automatic process control system of the type having a primary measuring element for producing a current proportional to a measured variable of the process and means for developing an electrical error signal proportional to the deviation of said current from a predetermined set point, automatic controller means including amplifier means provided with input means and an output circuit, means for connecting said error signal to a first point in said amplifier input means, means for feeding back an electrical signal from said output circuit to a second point in said amplifier input means, an electrical signal responsive output control circuit, means normally connecting said amplifier output circuit to said signal responsive control circuit so as to supply a first control signal thereto, manually operable control means including an adjustable control member for developing a second control signal, switch means for connecting said manually operable control means to said signal responsive control circuit in place of said amplifier output circuit, and means for comparing said first and second control signals so that the position of said adjustable control member may be correlated to the corresponding values of said second control signal and said control member may be adjusted to provide substantially bumpless changeover from automatic to manual operation.

17. In an automatic process control system of the type having a primary measuring element for producing a current proportional to a measured variable of the process and means for developing an electrical error signal proportional to the deviation of said current from a predetermined set point, automatic controller means including amplifier means provided with input means and an output circuit, means for connecting said error signal to a first point in said amplifier input means, means including a condenser for feeding back an electrical signal from said output circuit to a second point in said amplifier input means, an electrical signal responsive output control circuit, means normally connecting said amplifier output circuit to said signal responsive control circuit so as to supply a first control signal thereto, manually operable control means for developing a second control signal, and switch means for connecting said manually operable control means to said signal responsive control circuit in place of said amplifier output circuit and supplying a feedback control signal to said condenser which is proportional to said second control signal, thereby to minimize variations in the process when changing from manual to automatic operation.

18. In an automatic process control system of the type having a primary measuring element for producing a current proportional to a measured variable of the process and means for developing an electrical error signal proportional to the deviation of said current from a predetermined set point, automatic controller means including amplifier means provided with input means and an output circuit, means for connecting said error signal to a first point in said amplifier input means, an electrical signal responsive output control circuit, means connecting said amplifier output circuit to said signal responsive control circuit, a control network including a condenser connected to a second point in said amplifier input means, means for supplying a feedback signal proportional to the voltage of said amplifier output circuit to said condenser so as to provide automatic reset mode of control of the process, manually operable control means for developing a second control signal, and switch means for connecting said manually operable control means to said signal responsive control circuit in place of said amplifier output circuit and supplying a feedback control signal to said condenser which is proportional to said second control signal, thereby to minimize variations in the process when changing from manual to automatic operation.

19. In an automatic process control system of the type having a primary measuring element for producing a current proportional to a measured variable of the process and means for developing an electrical error signal proportional to the deviation of said current from a predetermined set point, amplifier means including input-means and an output circuit, means for connecting said error signal to a first point in said amplifier input means, an electrical signal responsive output control circuit, means connecting said output circuit to said signal responsive control circuit, a control network including a condenser, and means connecting said condenser between said output circuit and a second point in said amplifier input means, thereby to provide automatic reset mode of control of the process.

20. In an automatic process control system of the type having a primary measuring element for producing a current proportional to a measured variable of the process and means for developing an electrical error signal proportional to the deviation of said current from a predetermined set point, amplifier means including input means and an output circuit, means for connecting said error signal to a first point of said amplifier input means, an electrical signal responsive output control circuit, means effectively connecting said amplifier output circuit to said signal responsive output control circuit, an integration network, and means connecting said integration network between said amplifier output circuit and a second point of said amplifier input means, whereby the voltage of said output circuit includes a component proportional to the rate of change of said error signal.

References Cited in the file of this patent

UNITED STATES PATENTS

| | | |
|---|---|---|
| 1,131,202 | Boyden | Mar. 9, 1915 |
| 1,877,810 | Chamberlain | Sept. 20, 1932 |
| 1,986,613 | Warren | Jan. 1, 1935 |
| 2,025,542 | Lugar | Dec. 24, 1935 |
| 2,119,061 | Stein | May 31, 1938 |
| 2,240,244 | Cook | Apr. 29, 1941 |
| 2,317,807 | Ryder | Apr. 27, 1943 |
| 2,382,941 | Moore | Aug. 14, 1945 |
| 2,422,313 | Razek | June 17, 1947 |
| 2,531,257 | Cowherd | Nov. 21, 1950 |
| 2,600,039 | Whaley | June 10, 1952 |
| 2,614,163 | Roper | Oct. 14, 1952 |
| 2,661,725 | Bowditch | Dec. 8, 1953 |
| 2,666,585 | Gess | Jan. 19, 1954 |
| 2,688,334 | Jewett | Sept. 7, 1954 |
| 2,701,576 | Higgins | Feb. 8, 1955 |
| 2,734,155 | Schuck | Feb. 7, 1956 |
| 2,800,913 | Swartwout | July 30, 1957 |
| 2,809,000 | Brannin | Oct. 8, 1957 |